(12) United States Patent
Sesko

(10) Patent No.: US 7,876,456 B2
(45) Date of Patent: Jan. 25, 2011

(54) INTENSITY COMPENSATION FOR INTERCHANGEABLE CHROMATIC POINT SENSOR COMPONENTS

(75) Inventor: David William Sesko, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 69 days.

(21) Appl. No.: 12/463,936

(22) Filed: May 11, 2009

(65) Prior Publication Data

US 2010/0284025 A1 Nov. 11, 2010

(51) Int. Cl.
*G01B 11/24* (2006.01)
*G01B 11/28* (2006.01)

(52) U.S. Cl. ...................... 356/609; 356/630

(58) Field of Classification Search ................. 356/609, 356/625, 630
See application file for complete search history.

(56) References Cited

U.S. PATENT DOCUMENTS

| | | | |
|---|---|---|---|
| 4,585,349 A | 4/1986 | Gross | |
| 4,820,048 A | 4/1989 | Barnard | |
| 5,379,065 A | 1/1995 | Cutts | |
| 5,578,745 A | 11/1996 | Bayer | |
| 5,644,512 A | 7/1997 | Chernoff | |
| 5,785,651 A | 7/1998 | Kuhn | |
| 6,016,684 A | 1/2000 | Scheer | |
| 6,028,008 A | 2/2000 | Bayer | |
| 6,029,115 A | 2/2000 | Tracy | |
| 6,327,041 B1 | 12/2001 | Guern | |
| 6,480,285 B1* | 11/2002 | Hill | ............................ 356/492 |
| 6,869,480 B1 | 3/2005 | Abel | |
| 7,002,143 B2 | 2/2006 | Parker | |
| 2005/0030528 A1 | 2/2005 | Geffen | |
| 2006/0024061 A1* | 2/2006 | Wirth et al. | .................. 398/129 |
| 2006/0109483 A1 | 5/2006 | Marx | |

(Continued)

FOREIGN PATENT DOCUMENTS

DE  42 11 875 A1  10/1993

(Continued)

OTHER PUBLICATIONS

European Search Report mailed Mar. 6, 2009, issued in corresponding European Application No. EP 08 16 7845, filed Oct. 29, 2008.

(Continued)

*Primary Examiner*—Roy Punnoose
(74) *Attorney, Agent, or Firm*—Christensen O'Connor Johnson Kindness PLLC

(57) ABSTRACT

Methods for providing compensation for non-uniform response of a light source and wavelength detector subsystem of a chromatic point sensor (CPS) are provided. Light from the light source is input into an optical path that bypasses the measurement path through a CPS optical pen and provides the bypass light to the wavelength detector to provide a raw intensity profile distributed over the pixels of detector. The resulting set of raw intensity profile signals are analyzed to determine a set of error compensation factors for wavelength-dependent intensity variations that occur in the raw intensity profile signals. Later, the error compensation factors may be applied to reduce distortions and asymmetries that may otherwise occur in the shape of the signals in the peak region of CPS distance measurement profile signal data. The disclosed methods may provide enhanced accuracy, robustness, field-testing, and interchangeability for CPS components, in various embodiments.

20 Claims, 12 Drawing Sheets

U.S. PATENT DOCUMENTS

| | | |
|---|---|---|
| 2006/0197949 A1 | 9/2006 | Bouzid |
| 2007/0148792 A1 | 6/2007 | Marx |
| 2010/0225926 A1* | 9/2010 | van Amstel et al. ......... 356/511 |

FOREIGN PATENT DOCUMENTS

| | | |
|---|---|---|
| DE | 102 28 477 A1 | 1/2004 |
| DE | 10 2004 052 205 A1 | 5/2006 |
| EP | 1 647 799 A1 | 4/2006 |

OTHER PUBLICATIONS

Geary, J.M., "Introduction to Lens Design," Willmann-Bell, Richmond, Va., 2002, p. 176.

Molesini, G., and F. Quercioli, "Pseudocolor Effects of Longitudinal Chromatic Aberration," Journal of Optics (Paris) 17(6):279-282, Nov. 1986.

Nahum, M., "On-site Calibration Method and Object for Chromatic Point Sensors," U.S. Appl. No. 12/330,431, filed Dec. 8, 2008.

"Optical Pens: Micrometric Measurement Range," Stil S.A., Aix-en-Provence, France, product brochure published on or before Mar. 6, 2007.

Sesko, D.W., "Dynamic Compensation of Chromatic Point Sensor Intensity Profile Data Selection," U.S. Appl. No. 11/940,214, filed Nov. 14, 2007.

Smith, W.J., "Modern Optical Engineering," 3d ed., SPIE Press—McGraw-Hill, New York, 2000, p. 94.

Villatoro, J., et al., "Fabrication and Modeling of Uniform-Waist Single-Mode Tapered Optical Fiber Sensors," Applied Optics 42(13):2278-2283, May 1, 2003.

* cited by examiner

INTENSITY COMPENSATION FOR INTERCHANGEABLE CHROMATIC POINT SENSOR COMPONENTS

FIELD OF THE INVENTION

The invention relates generally to precision measurement instruments, and more particularly to chromatic point sensors and similar optical distance determining devices.

BACKGROUND OF THE INVENTION

It is known to use chromatic confocal techniques in optical height or distance sensors. As described in U.S. Patent Application Publication No. US2006/0109483 A1, which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the surface height or distance relative to the focusing element determines which wavelength is best focused. Upon reflection from the surface, the light is refocused onto a small detector aperture, such as a pinhole or the end of an optical fiber. Upon reflection from the surface and passing back through the optical system to the in/out fiber, only the wavelength that is well-focused on the surface is well-focused on the fiber. All of the other wavelengths are poorly focused on the fiber, and so will not couple much power into the fiber. Therefore, for the light returned through the fiber, the signal level will be greatest for the wavelength corresponding to the surface height or distance to the surface. A spectrometer type detector measures the signal level for each wavelength, in order to determine the surface height.

Certain manufacturers refer to practical and compact systems that operate as described above, and that are suitable for chromatic confocal ranging in an industrial setting, as chromatic point sensors. A compact chromatically-dispersive optical assembly that is used with such systems is referred to as an "optical pen", or a "pen". The optical pen is connected through an optical fiber to an electronic portion of the chromatic point sensor which transmits light through the fiber to be output from the optical pen and which provides a spectrometer that detects and analyzes the returned light. The returned light forms a wavelength-dispersed intensity profile received by the spectrometer's detector array. Pixel data corresponding to the wavelength-dispersed intensity profile is analyzed to determine the "dominant wavelength position coordinate" for the intensity profile, and the resulting pixel coordinate is used with a lookup table to determine the distance to the surface.

An important issue with chromatic point sensors is the stability of their components relative to their calibration. Chromatic point sensors provide very high resolution and accuracy (e.g., sub-micron resolution and accuracy) based on distance calibration data that correlates known measurement distances with the resulting dominant wavelength position coordinate along the array. At the level of resolution and accuracy provided by chromatic point sensors, component behavior inevitably drifts relative to the behavior provided at the time of calibration, resulting in measurement errors. Known methods of recalibration generally require equipment and/or a level expertise that is impractical for end-users to provide. Thus, if the measurement accuracy degrades, or if a user desires to replace a specific component of the chromatic point sensor (such as the optical pen), the entire unit may need to be sent back to the factory for recalibration.

European Patent EP 1647799 to Michelt (the '799 Patent), which is hereby incorporated herein by reference in its entirety, discloses a method for separately calibrating a chromatic point sensor pen and a chromatic point sensor spectrograph that are to be used in combination. According to the '799 Patent, first calibration factors are determined for the pen by using a calibrated spectrometer to establish a certain wavelength and determining the certain distance from the measuring head to a reference surface for which the maximum intensity arises for that certain wavelength. Second calibration factors are determined for the chromatic point sensor spectrograph by determining which output signals are produced by the spectrograph when one supplies it with light of that certain wavelength. However, for various reasons, the method of the '799 Patent has not proven satisfactory in commercial practice. Providing improved, simplified, and/or more reliable recalibration for chromatic point sensors is desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Deficiencies arise in the method of the '799 Patent because it is based on an idealization of chromatic point sensor (CPS) operation that is not achieved in practice. For example, in particular, the method disclosed in the '799 Patent does not adequately address the fact that at any time during normal operation the CPS optical pen ordinarily receives broadband light, not a "certain wavelength" as disclosed in the '799 Patent. Thus, in normal operation the CPS pen ordinarily returns a certain range or peak region of wavelengths for a "certain distance", not a "certain wavelength" as disclosed in the '799 Patent. The representative wavelength of this peak region that is associated with the corresponding "certain distance" depends on the overall shape of the peak region (e.g., as determined by a curve fit, or a centroid determination, or the like.) For a given workpiece surface, the overall shape of the peak region depends on the shape of the intensity spectrum of the broadband light supplied to the CPS pen, as well as the wavelength-dependent characteristics of the CPS pen. Supplying a "certain wavelength" to the CPS pen during calibration prevents encompassing these "wavelength-distributed" effects in the CPS optical pen calibration data.

Similarly, in normal operation the CPS spectrometer ordinarily receives a certain range or peak region of wavelengths for a "certain distance", as noted above, not a "certain wavelength" as disclosed in the '799 Patent. It should be appreciated that the CPS spectrometer may distort the shape of peak region of wavelengths, and thus influence the corresponding representative wavelength. Supplying a "certain wavelength" to the CPS spectrometer during calibration, as disclosed in the '799 Patent, prevents encompassing these wavelength-distributed effects in the CPS spectrometer calibration data.

The systems and methods of the present invention provide component calibration data, also referred to as compensation data, that encompasses the effects of wavelength-dependent variations (e.g., nonuniform response) in the CPS the spectrometer, and/or the CPS broadband light source. The practicality and economy CPS field calibration and/or error-checking may also be enhanced.

The method may be utilized with a CPS electronics including a CPS source+detector subsystem comprising a CPS light source (a broadband light source) and a CPS wavelength detector. Light from the CPS light source is input into an optical path that bypasses the typical optical measurement path through the CPS optical pen and provides the bypass light to the CPS wavelength detector, and the bypass light is transmitted to form a raw intensity profile distributed over a plurality of pixels along the CPS wavelength detector measurement axis. The CPS wavelength detector is then operated to provide a set of initial or raw intensity profile signals corresponding to the plurality of pixels along the wavelength detector measurement axis.

In one implementation, the raw intensity profile signals are analyzed to determine a set of short range error compensation factors for significant "short range" raw intensity profile signal variations that occur cyclically over the range of the wavelength detector or within a typical wavelength range of a peak region corresponding to a distance measurement of the CPS. In some embodiments, such short range raw intensity profile signal variations may be attributed primarily to a CPS wavelength detector error component (e.g., wavelength-dependent amplitude variations caused by interference effects in a thin film coating on the detector array, etc.). The short range error component at each detector pixel may be compensated by application of a corresponding member of the set of short range error compensation factors, with the result that detector distortions of the shape of the signals in a CPS measurement peak region are significantly reduced. In one embodiment, the set of short range error compensation factors may be determined so as to provide a relatively uniform detector response or gain for all detector pixels. In another embodiment, the set of short range error compensation factors may be determined so as to provide a predetermined detector response or gain for various detector pixels, for example to provide a standardized detector response curve or gain for the various detector pixels. In such implementations, CPS wavelength detectors and/or their host electronics may behave more predictably, and may in used interchangeably in some embodiments.

In one implementation, the raw intensity profile signals are analyzed to determine a set of long range compensation factors for "long range" raw intensity profile signal variations that occur over the range of the wavelength detector. In one embodiment, long range raw intensity profile signal variations may be the variations that remain after the previously discussed short range raw intensity profile signal variations are removed. In some embodiments, such long range raw intensity profile signal variations may be attributed primarily to variations in the CPS light source intensity at different wavelengths. The long range error component at each detector pixel may be compensated by application of a corresponding member of the set of long range error compensation factors, with the result that distortions of the shape of the signals in a CPS measurement peak region due to source intensity variations with wavelength are significantly reduced. In one embodiment, the set of long range error compensation factors may be determined so as to provide relatively uniform compensated light source intensity for all detector pixels. In another embodiment, the set of long range error compensation factors may be determined so as to provide a predetermined or standardized light source intensity curve for all detector pixels. In such implementations, CPS light sources and/or their host electronics may behave more predictably, and may in used interchangeably in some embodiments.

In one implementation, the raw intensity profile signals are analyzed to determine a set of CPS source+detector subsystem error compensation factors for combined raw intensity profile signal variations that occur over the range of the wavelength detector. In some embodiments, such combined raw intensity profile signal variations may be understood as a combination of the previously outlined short range and long range raw intensity profile signal variations. The combined error component at each detector pixel may be compensated by application of a corresponding member of the set of CPS source+detector subsystem error compensation factors, with the result that distortions of the shape of the signals in a CPS measurement peak region due to combined source intensity variations and wavelength-dependent detector errors are significantly reduced. In one embodiment, the set of source+detector subsystem error compensation factors may be determined so as to provide a relatively uniform compensated source+detector subsystem signal for all detector pixels. In another embodiment, the set of source+detector subsystem error compensation factors may be determined so as to provide a standardized source+detector signal curve for all detector pixels. In such implementations, CPS light source+detector subsystems and/or their host electronics may behave more predictably, and may in used interchangeably in some embodiments.

In one implementation, a CPS optical pen is calibrated using a CPS electronics comprising a source+detector subsystem and corresponding error compensation factors such that the compensated source+detector subsystem provides a known or standardized source+detector signal curve for all detector pixels. CPS optical pen calibration comprises setting a workpiece surface at a series of known distances from the CPS pen and determining the corresponding distance indicating coordinates (e.g., a pixel coordinate determined with sub-pixel resolution) corresponding to the peak of the resulting compensated peak region signals on the wavelength detector of the known or standardized source+detector subsystem. In such implementations, combinations of CPS optical pens and such known or standardized light source+detector subsystems behave more predictably than prior art systems, and CPS optical pens calibrated in this manner may be used interchangeably with such known or source+detector subsystems in some embodiments.

It should be appreciated that CPS measurement profile peak region signals may extend over a range of several pixels on the wavelength detector, or several tens or pixels, or more. In the absence of the compensation methods outlined above, the shape of the CPS measurement profile peak region signals generally includes some type of distortion that is unique to specific to a light source, or wavelength detector, or both. Unless this unique shape distortion is compensated the determination of the peak location for the measurement profile peak region will be inconsistent or erroneous for different CPS systems, and potentially inconsistent or erroneous for various measurement distances within a particular CPS system. Thus, it is important in various implementations that the error compensation factors outlined above be applied to the measurement profile peak region signals prior to the determination of the sub-pixel resolution distance indicating coordinate that indicates the peak location of the measurement profile peak region signals.

It should be appreciated that when a CPS source+detector subsystem is characterized to determine error compensation factors as outlined above, then a similar characterization can be repeated at a later time, and any significant changes in the apparent error compensation factors may be indicative of component drift due to environment or degradation. Such significant changes may be detected by operations of the CPS electronics, or a host system connected to the CPS electronics. When combined source+detector subsystem error compensation factors are determined, changes in the source+detector subsystem as a whole may be detected. When short range and/or long range error compensation factors are determined, the CPS wavelength detector and/or the CPS light source may be diagnosed separately for changes. Appropriate system error indications or warnings may be output from the CPS electronics, or a host system, to a user when such significant changes are detected. Alternatively, or in addition, the error compensation factors may be updated to adjust for such changes and reestablish the accuracy of the CPS system. Of course, when the error compensation factors are known to be stable or accurate, any other changes in measurement results for known measurement distances or calibration objects may be attributed to the CPS optical pen, and appropriate corrective measures may be taken with respect to the CPS pen.

As explained in greater detail below, application of the various error compensation factors outlined may effectively "smooth" the wavelength detector response as well the overall measurement distance calibration curve for a CPS. In addition to the other benefits described above, this may make the CPS measurements more robust and stable, in that small system drifts or instabilities are more likely to result in a proportionately small "smooth" change in measurement results.

As previously outlined, in various implementations, light from the CPS light source is input into an optical path that it bypasses the normal optical path through the CPS optical pen and directs the bypass light for the CPS light source to the CPS wavelength detector. In some embodiments, the bypassing optical path is provided by disconnecting the CPS pen and connecting a connector of the normal optical fiber path to an optical fiber path that lead so the CPS wavelength detector. In another embodiment, the bypassing optical path is provided by disconnecting the CPS pen and providing a mirror that receives light from, and reflects light to, the normal optical fiber path such that it is directed to the CPS wavelength detector. In another embodiment, the CPS optical pen may include a movable mirror and the bypassing optical path is provided by moving the mirror into position to receive light from, and reflect light to, the normal optical fiber path without allowing the light to reach the lenses of the CPS optical pen.

It will be appreciated that additional benefits may be obtained in some implementations by correlating specific pixels on the wavelength detector with specific wavelengths of light (e.g., according to known spectrometer calibration methods) for purposes of being able to interchange various components while maintaining the highest level of CPS system accuracy. It will further be appreciated that the above-described error compensation methods may be applied for "in the field" calibration or error checking, factory calibration or error checking, or both

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
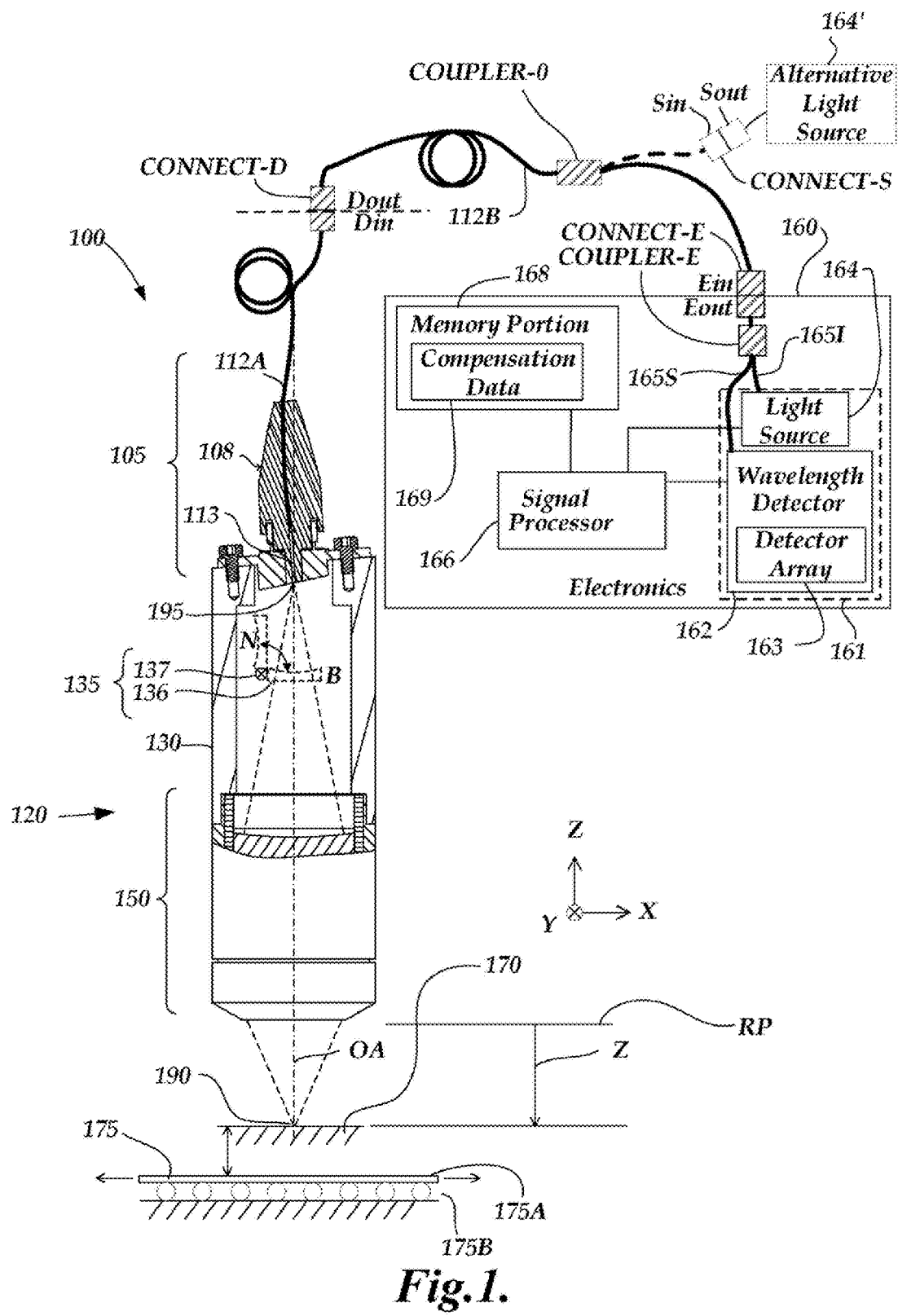
FIG. 1 is a block diagram of one embodiment of an exemplary chromatic point sensor formed in accordance with the present invention.

FIG. 1 is a block diagram of one exemplary embodiment of a chromatic point sensor 100 formed in accordance with the present invention. As shown in FIG. 1, the chromatic point sensor 100 includes an optical pen 120 and an electronics portion 160. The optical pen 120 includes an in/out fiber optic sub-assembly 105, a housing 130, and an optics portion 150. The in/out fiber optic sub-assembly 105 comprises an in/out optical fiber 113 carried through a fiber optic cable 112 which encases it, and a fiber optic connector 108. The in/out optical fiber 113 outputs an output beam through an aperture 195, and receives reflected measurement signal light through the aperture 195.

In operation, light emitted from the fiber end through the aperture 195 is focused by the optics portion 150, which includes a lens that provides an axial chromatic dispersion such that the focal point along the optical axis OA is at different distances depending on the wavelength of the light, as is known for chromatic confocal sensor systems. As will be described in more detail below, during measurement operations, the light is focused on a surface location 190 of a workpiece 170. Upon reflection from the surface location 190, the light is refocused by the optics portion 150 onto the aperture 195. Due to the axial chromatic dispersion provided by the optics portion 150, only one wavelength will have the focus distance that matches the measurement distance "Z", which is the distance from a reference position RP that is fixed relative to the optical pen 120 to the surface location 190. The chromatic point sensor is configured such that the wavelength that is best focused at the surface location 190 will also be the wavelength that is best focused at the aperture 195. The aperture 195 spatially filters the reflected light such that predominantly the best focused wavelength passes through the aperture 195 and into the core of the optical fiber 113 of the optical fiber cable 112. As will be described in more detail below, the optical fiber cable 112 routes the signal light to a wavelength detector 162 that is utilized for determining the wavelength having the dominant intensity, which corresponds to the measurement distance Z to the surface location 190.

In the embodiment shown in FIG. 1, the electronics portion 160 includes a signal processor 166, a memory portion 168 and a source+detector subsystem 161 comprising a wavelength detector 162, and a broadband light source 164 (also referred to as a white light source). In various embodiments, the wavelength detector 162 includes a detector array 163 of a spectrometer. The wavelength detector 162 may also include related signal processing (e.g., provided by the signal processor 166, in some embodiments) that removes or compensates certain error components from the profile data that is provided by the detector array 163, by using compensation data 169 that may be stored in memory portion 168. Thus, certain aspects of the wavelength detector 162 and the signal processor 166 may be merged and/or indistinguishable in some embodiments.

The electronics portion 160 is coupled to the optical pen 120 through an optical path including the fiber optic cable 112. In the embodiment shown in FIG. 1, optional or alternative aspects of the optical path are shown, including the fiber optic 112 having first and second segments 112A and 112B joined at connector CONNECT-O, a connector CONNECT-D in the fiber optic segment 112B, and a 2×1 coupler COUPLER-O which may allow an optional alternative light source 164' to be spliced into the optical path of the CPS through the connector CONNECT-S. In various methods according to this invention, light is input directly from a CPS light source into the CPS wavelength detector 162 such that the CPS optical pen 120 is bypassed when determining error compensation factors for correcting certain errors associated with the source+detector subsystem 161. The optional or alternative aspects of the optical path outlined above may be useful for bypassing the CPS optical pen 120, as well as for other calibration operations, as will be described in greater detail below.

During normal measurement operations, the broadband light source 164, which is controlled by the signal processor 166, is coupled to the CPS optical pen 120 through a fiber optic path including the illumination fiber segment 165I, the 2×1 coupler COUPLER-E, CONNECTOR-E, and the fiber optic cable 112. As described above, the light travels through the optical pen 120 which produces longitudinal chromatic aberration. The wavelength of light that is most efficiently transmitted back through the aperture 195 and into the fiber optic cable 112 is the wavelength that is in focus on the surface location 190. The reflected wavelength-dependent light intensity then passes back through the fiber optic path to the electronics portion 160 and the coupler COUPLER-E so that approximately 50% of the light is directed through the signal fiber segment 165S to the wavelength detector 162. The wavelength detector 162 receives the wavelength-dependent light intensity, converts it to a spectral intensity profile distributed over an array of pixels along a measuring axis of the detector array 163, and operates to provide corresponding profile data based on pixel data output from the detector array 163. The subpixel-resolution distance indicating coordinate (DIC) of the profile data is calculated by the signal processor 166 and the DIC determines the measurement distance Z to the surface location 190 via a distance calibration lookup table or the like, which is stored in the memory portion 168, as will be described in more detail below with respect to FIG. 4. The distance indicating coordinate may be determined by various methods described further below (e.g., by determining the centroid of profile data included in a peak region of the profile data). When the distance indicating coordinate is determined during calibration operations, it may be referred to as a calibration distance indicating coordinate, and when it is determined during workpiece surface measurement operations, it may be referred to as a measurement distance indicating coordinate. The profile data used to determine the subpixel distance indicating coordinate is described in greater detail below.

As previously indicated, in various methods according to this invention light is input directly from a CPS light source into the CPS wavelength detector 162 such that the CPS optical pen 120 is bypassed. FIG. 1 shows an optional or alternative bypass mechanism 135 in the optical pen 120, which may be used instead of, or in addition to, the optional elements along the fiber optic cable 112. In the particular embodiment shown in FIG. 1, the bypass mechanism 135 comprises a bypass reflector 136 (e.g., a mirror), and a bypass reflector actuator 137 (e.g., a rotating mounting shaft). During normal operation, the bypass reflector 136 is positioned out of the optical path, e.g., at the position "N". For certain error compensation factor determination operations described further below, or other calibration operations, the bypass reflector 136 is positioned in the optical path, e.g., at the position "B", to reflect broadband light output from the aperture 195 back through the aperture 195, nominally without altering the relative intensities of the various wavelengths included within the broadband light.

FIG. 1 includes orthogonal XYZ coordinate axes, as a frame of reference. The Z direction is defined to be parallel to the optical axis, or distance-measuring axis, of the optical pen 120. As illustrated in FIG. 1, during operation, the workpiece 170 is placed along the optical axis OA of the optical pen 120. In one embodiment, the workpiece 170 is aligned and mounted on a translation stage 175 which may be advantageously aligned such that it translates along the X axis direction constrained by guide bearings 175b, with its surface 175A nominally parallel to the XY plane. Other exemplary features and operations of the chromatic point sensor 100 will be described in more detail below.

Figure 2:
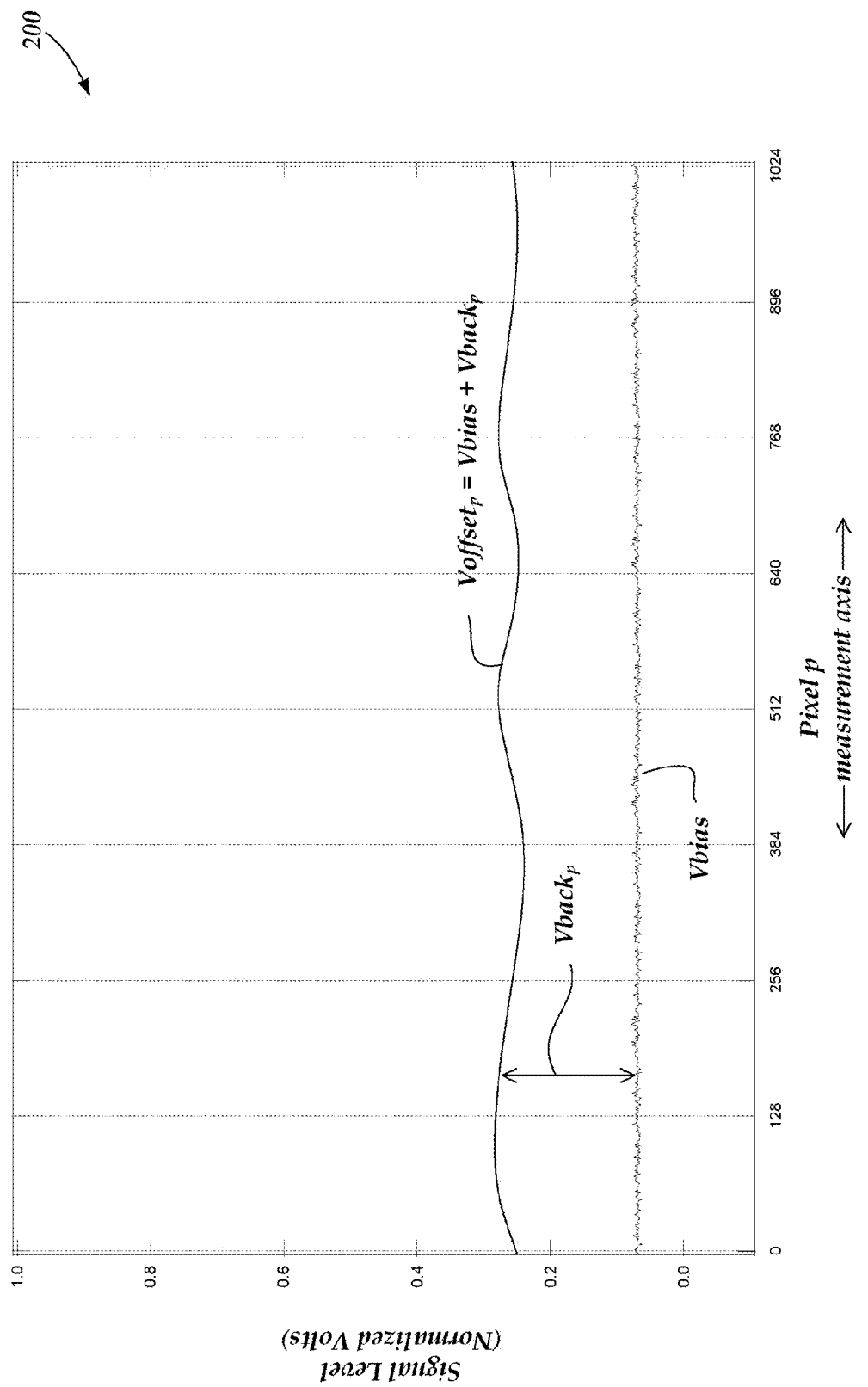
FIG. 2 is a diagram of profile data from a chromatic point sensor illustrating voltage offset signal levels for the pixels in a detector array.

The following description of FIG. 2 outlines certain known background signal processing and/or calibration operations that may be used in combination with this invention, in various embodiments. The purpose of this description is to emphasize that the inventive methods disclosed further below are distinct from, but compatible with, these operations. FIG. 2 is a diagram 200 of profile data from a chromatic point sensor illustrating voltage offset signal levels Voffset(p) for the pixels in a detector array 163 when no measurement surface is present (e.g., surface 190 of FIG. 1 is not present), such that there is no intentionally reflected light and no significant dominant wavelength peak in the resulting intensity profile. As shown in FIG. 2, the voltage offset signal Voffset (p) is plotted in normalized volts, for each of 1,024 pixels. "Normalized volts" assigns a value of 1.0 to the saturation voltage of the detector array 163. The voltage offset signal Voffset(p) includes a bias signal level Vbias, which is shown as unvarying across the array, and a background signal component Vback(p), which is shown as being dependent upon the pixel coordinate p across the array. The variable background signal Vback(p) represents signals such as background light from wavelength-dependent spurious reflections and the like in the chromatic point sensor, as well as due to the dark current of the various pixels p. In various embodiments, it is advantageous if the signal components Vback(p) (or signals that show the same variation, such as the voltage offset signals Voffset(p)) are stored for calibration or compensation of the pixel array of the detector array 163, and used to compensate all subsequent profile data signals from each pixel p (e.g., by subtraction), on an ongoing basis. Thus, it will be understood that the background signal component Vback (p) is assumed to be compensated in a known manner in various embodiments according to this invention, and it is not necessary that it be further explicitly considered or described in relation to the various intensity profiles or inventive signal processing operations, or the like, described below.

In contrast to the background signal component Vback(p), which may be relatively stable over time, the coordinate-independent bias signal level Vbias may change as a result of voltage drifts associated with ambient temperature changes and heat generated by the electronics portion 160 during operation. The following description of FIGS. 3 and 4 outlines certain signal processing operations that determine distance indicating coordinates based on a distance-indicating subset of the profile data that is dynamically adapted to compensate for changes in the contemporaneous bias signal level Vbias, resulting in more repeatable distance measurements. The operations outlined here are described in more detail in commonly assigned U.S. patent application Ser. No. 11/940, 214, (the '214 Application) and Ser. No. 12/330,431 (the '431 Application) which are hereby incorporated by reference in their entirety. The purpose of this description is to provide background information which is useful for an overall understanding of chromatic point sensor distance measurement operations, and to emphasize that the inventive methods disclosed further below are distinct from, but compatible with, these operations.

Figure 3:
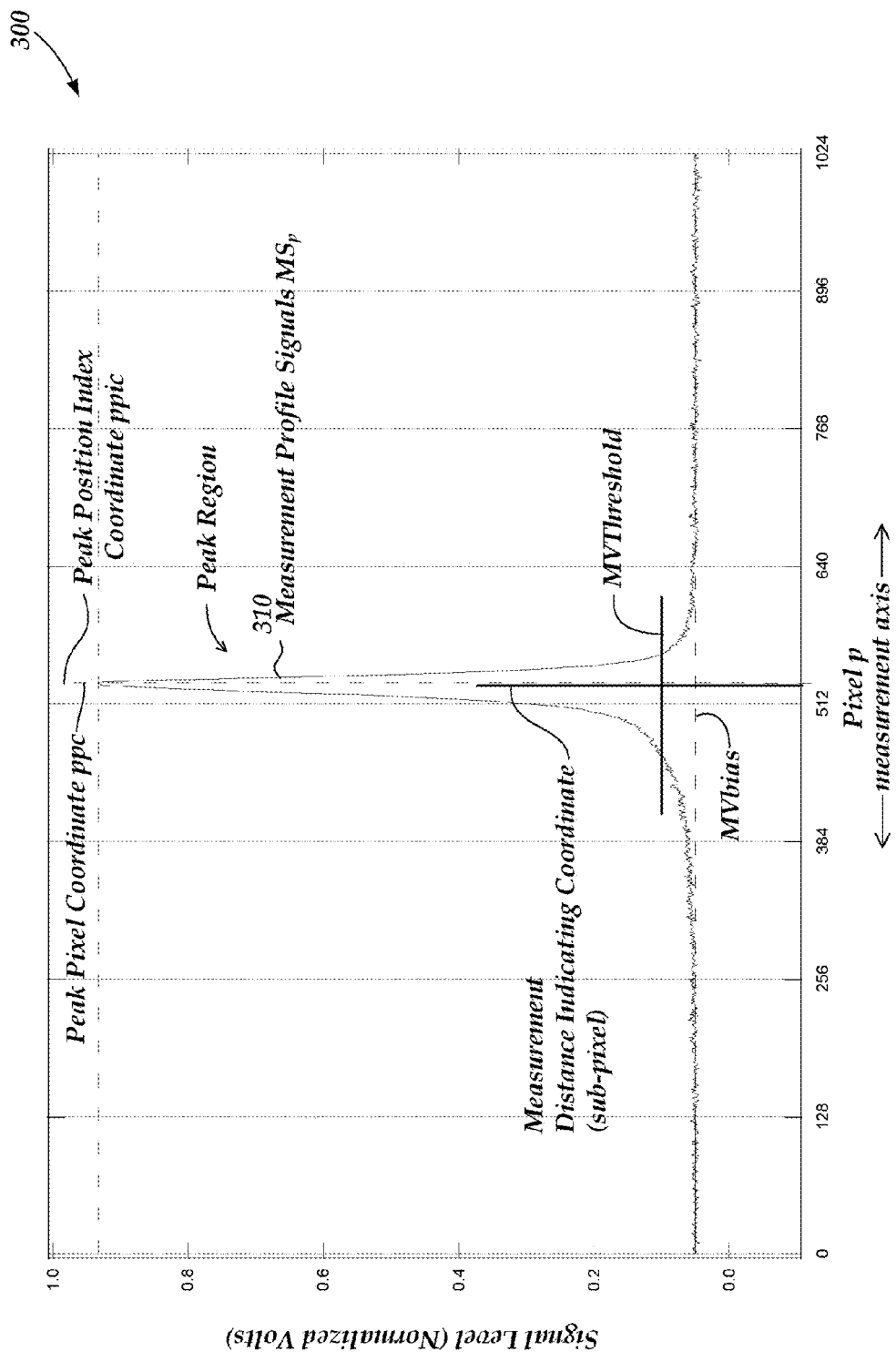
FIG. 3 is a diagram of profile data from a chromatic point sensor illustrating a peak region signal corresponding to a measurement distance indicating coordinate.

FIG. 3 is a diagram 300 of profile data 310 (measurement profile signal data) from a CPS detector (e.g., detector 162), as acquired during CPS measurement operations, either during certain optical pen or overall system calibration operations or during regular measurement operation. The profile data 310 may also be referred to as the profile signals MS(p), where MS(p) is the signal level (shown in normalized volts) associated with each pixel p of a detector array (e.g., the detector array 163). The graph 300 of FIG. 3 is created with a target surface positioned at some distance along the optical axis OA of the optical pen 120, producing the corresponding measurement profile data 310 having the dominant wavelength peak region shown in FIG. 3.

FIG. 3 shows a bias signal level MVbias (in normalized volts), a peak pixel coordinate ppc, a peak position index coordinate ppic, and a data threshold MVthreshold that defines the lower limit of a distance-indicating subset of the data in the peak region. All "MV" values are in normalized volts. FIG. 3 also shows a distance indicating coordinate (DIC) that is determined based on the distance-indicating subset of the data in the calibration spectral peak region. As described in the '214 Application, MVthreshhold may be an index-specific threshold, MVthreshhold(ppic), in some embodiments.

Briefly, in one embodiment, measurement operations for determining a distance indicating coordinate (e.g., a distance indicating coordinate DIC, as described relative to the profile data 310), may include the following:

Position the target surface along the optical axis OA, and capture the resulting profile data 310.

Determine the peak pixel coordinate (that is, the pixel having the highest signal).

Determine the peak position index coordinate ppic, which is the index for storing and retrieving certain calibration data (e.g., index-specific threshold calibration data). This may be the same as the peak pixel coordinate in some embodiments.

Determine the measurement bias signal level MVbias.

Determine the data threshold MVthreshhold (e.g., as a percentage of the peak height, or based on index-specific threshold calibration data that corresponds to the current peak position index coordinate ppic).

Determine the distance indicating coordinate DIC with sub-pixel resolution, based on the distance-indicating subset of the data that has a value greater than MVthreshhold in the measurement peak region.

Figure 4:
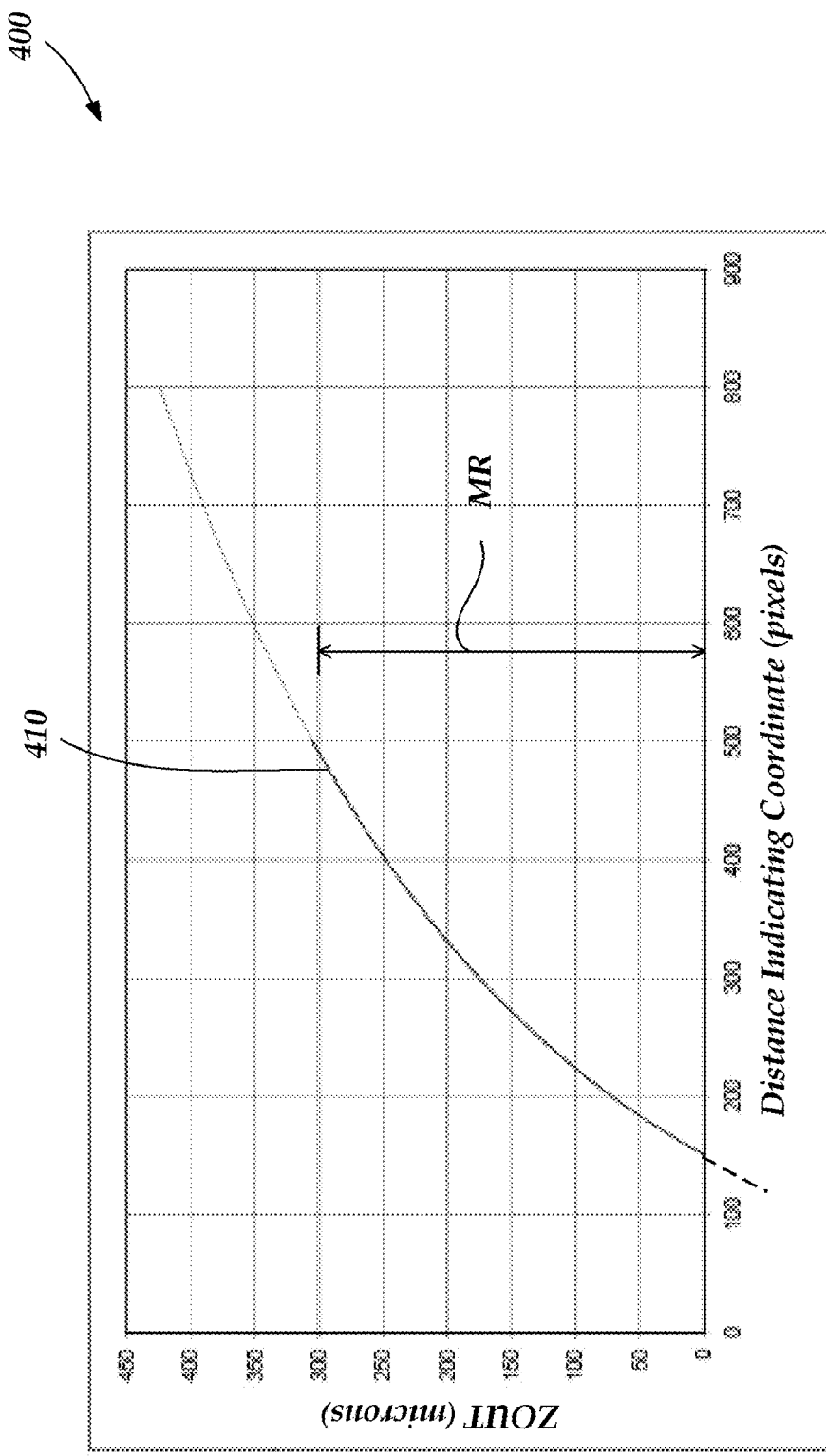
FIG. 4 is a diagram of chromatic point sensor distance calibration data which correlates known measurement distances with distance indicating coordinates for a chromatic point sensor.

For a distance calibration measurement, independently determine the corresponding distance to the target surface with a desired accuracy (e.g., by interferometer), and determine a distance calibration data point in a distance calibration table or curve (e.g., a distance calibration table or curve such as that represented by the distance calibration data 410, shown in FIG. 4).

For a normal workpiece distance measurement, determine the measurement distance by correlating the measurement DIC with a corresponding distance in the stored distance calibration data (e.g., a distance calibration table or curve such as that represented by the distance calibration data 410, shown in FIG. 4).

In the foregoing operations, the distance indicating coordinate DIC may be determined with sub-pixel resolution, based on the distance-indicating subset of data above MVthreshhold. A measurement DIC may be determined according to one of a number of different methods. In one embodiment, a measurement DIC may be determined as the subpixel-resolution coordinate of a centroid $X_C$ of the distance-indicating subset of data. For example, for a detector with 1024 pixels, the centroid $X_C$ may be determined according to:

$$X_C = \frac{\sum_{p=1}^{1024} p(S_M(p))^n}{\sum_{p=1}^{1024} (S_M(p))^n} \quad \text{(Eq. 1)}$$

where, $$S_M(p) = \quad \text{(Eq. 2)}$$

$$\begin{cases} MS_p - MVThreshold(ppic), \text{ for } MS_p \geq MVThreshold(ppic) \\ 0, \text{ for } MS_p < MVThreshold(ppic) \end{cases}$$

In one specific example, n=2, in EQUATION 1. It will be appreciated that EQUATION 2 restricts the data used in the centroid calculation to a distance-indicating subset of data. When the distance indicating coordinate DIC is determined during calibration operations, it may be referred to as a calibration distance indicating coordinate, as well as a measurement distance indicating coordinate.

FIG. 4 is a diagram 400 of CPS measurement distance calibration data 410 which correlates known or calibrated measurement distances ZOUT (in microns) along the vertical axis with distance indicating coordinates (in units of pixels) along the horizontal axis, for the chromatic point sensor 100, or the like. The example shown in FIG. 4 is for an optical pen having a specified measurement range MR of 300 microns, which corresponds to calibration distance indicating coordinates in the range of approximately 150-490 pixels. However, the chromatic point sensor 100 may be calibrated over a larger pixel range of the detector array 163, if desired. The reference or "zero" ZOUT distance is somewhat arbitrary, and may be set at a desired reference distance relative to the optical pen 120. Although the distance calibration data 410 appears to form a smooth curve, it should be appreciated that the distance calibration 410 for a typical prior art CPS system, particularly for economical CPS systems, may exhibit short range errors or irregularities such as those described in greater detail below with reference to FIG. 10A. Such short range errors or irregularities are masked by the low resolution of FIG. 4, but they are significant in practice, as described in greater detail below.

In some embodiments, the CPS measurement distance calibration data 410 may be determined and/or used as outlined above with reference to FIG. 3. One exemplary laboratory calibration method is briefly outlined here, to further clarify the nature of the CPS distance calibration data 410 and to provide a context for better appreciating the advantages provided by the inventive error compensation methods disclosed further below. Briefly, a mirror may provide a calibration surface (e.g., substituting for the surface 190 of FIG. 1) along the optical axis OA of the CPS optical pen. The displacement of the mirror may be controlled in approximately 0.1 or 0.2 micron steps. For each step, the actual mirror position or displacement is acquired using a reference standard, such as an interferometer. For each actual mirror position, the corresponding calibration distance indicating coordinate (DIC) of the chromatic point sensor is determined, based on the corresponding intensity profile data provided by the CPS detector (e.g., as outlined previously). The calibration distance indicating coordinate and the corresponding actual position are then recorded to provide the calibration data 410.

Later, during measurement operations, to provide a distance measurement for a workpiece surface (e.g., surface 190 of FIG. 1), the workpiece surface is positioned along the optical axis OA of the CPS optical pen. The measurement distance indicating coordinate of the chromatic point sensor is determined, based on the measurement distance indicating coordinate determined from the intensity profile data provided by the CPS detector. Then, the distance calibration data 410 is used to determine the CPS measurement distance ZOUT that corresponds to that specific measurement distance indicating coordinate.

The following description of FIGS. 5-12B outlines various embodiments of systems and methods for error compensation and/or calibration for CPS components according to this invention. For purposes of convenient and clear description, certain definitions and conventions are used as outlined and clarified here, unless otherwise indicated by explanation or context. "Z" refers to an actual measurement distance to a workpiece surface. "ZOUT" refers to the distance measurement output by the CPS based on a determined distance indicating coordinate DIC, which in turn depends on the corresponding profile signals $MS_p$, as previously described with respect to FIGS. 3 and 4. It will be appreciated that for each measurement distance Z the CPS will actually produce a unique set of these signals, which depend on Z. Therefore, we will refer to each such set of profile signals as $MS_p(Z)$, which produces a corresponding distance indicating coordinate DIC (Z) (e.g., determined according to EQUATIONS 1 and 2), which produces a corresponding CPS measurement output ZOUT(Z). Using these conventions, previous explanation indicates that the DIC(Z) that is associated with a distance Z depends on the overall shape of the peak region of the corresponding measurement profile data $MS_p(Z)$.

We also introduce here $MS_p$ superscripts that will be used further below, the superscripts RAW (meaning uncompensated), SRCOMP (meaning short range compensated), DGCOMP (meaning detector gain compensated), LRCOMP (meaning long range compensated), SICOMP (meaning source intensity compensated), COMBCOMP (meaning combined short range and long range compensated), SDSCOMP (meaning combined source+detector subsystem compensated), and PEN (meaning as produced by the optical pen 120 based on a designated or standardized source intensity spectrum).

Using these conventions, we introduce the following expression:

$$MS_p^{RAW}(Z) = SI_p^{RAW} * KPEN_p(Z) * DG_p^{RAW} \quad \text{(Eq. 3)}$$

wherein: $SI_p^{RAW}$ describes the relative or normalized intensities of the wavelengths included in the broadband light of a CPS light source, as the wavelengths are distributed at each pixel P of a designated or standardized wavelength detector. $KPEN_p(K)$ describes the relative or normalized transmission (or attenuation) of the wavelengths included in a set of measurement profile data input from a CPS pen to a CPS wavelength detector for a measuring distance Z, as the wavelengths are distributed at each pixel P of a designated or standardized wavelength detector. $KPEN_p(K)$ may be thought of as a distance-dependent transfer function of the CPS pen for each wavelength (or its corresponding detector pixel). $DG_p^{RAW}$ describes the relative or normalized signal gain associated with each pixel of a wavelength detector. Thus, EQUATION 3 indicates approximately that for a given measuring distance Z, the raw wavelength detector signal $MS_p^{RAW}(Z)$ at each pixel P equals the raw intensity $SI_p^{RAW}$ input to CPS pen at the wavelengths that reach pixel P, times the distance-dependent transfer function of the CPS pen $KPEN_p(Z)$ for the wavelengths that reach pixel P for distance Z, times the signal gain $DG_p^{RAW}$ for pixel P.

In practice, for prior art CPS systems it has been typical to determine a distance indicating coordinate DIC(Z) from a set of values $MS_p^{RAW}(Z)$ (e.g., as previously outlined with reference to FIGS. 3 and 4), and to use such DIC(Z)'s as the basis for calibration of a CPS system, in combination with their corresponding known Z values. It has not been typical to determine the individual characteristics of individual CPS components (e.g., as exemplified by the three factors on the right-hand side of EQUATION 3). Even the previously discussed '799 Patent, which suggests an idealized type of separate calibration for CPS optical pens and CPS wavelength detectors (spectrometers), falls short of recognizing and solving certain important practical problems. As a result prior art systems have not made it possible to determine and/or correct certain detrimental individual component characteristics and/or drift in practical systems, and particularly certain detrimental effects associated with the overall shape of realistic measurement profile peak regions. In contrast, in various embodiments, the present invention includes determining individual characteristics of at least one of the CPS light source and the CPS wavelength detector in a way that encompasses the relative strength of their "wavelength-dependent" signal effects in the measurement profile signal data used by the CPS, enabling the determination and/or correction of certain detrimental individual component characteristics and/or drift to provide more accurate and robust CPS systems using economical components and calibration methods.

Figure 5:
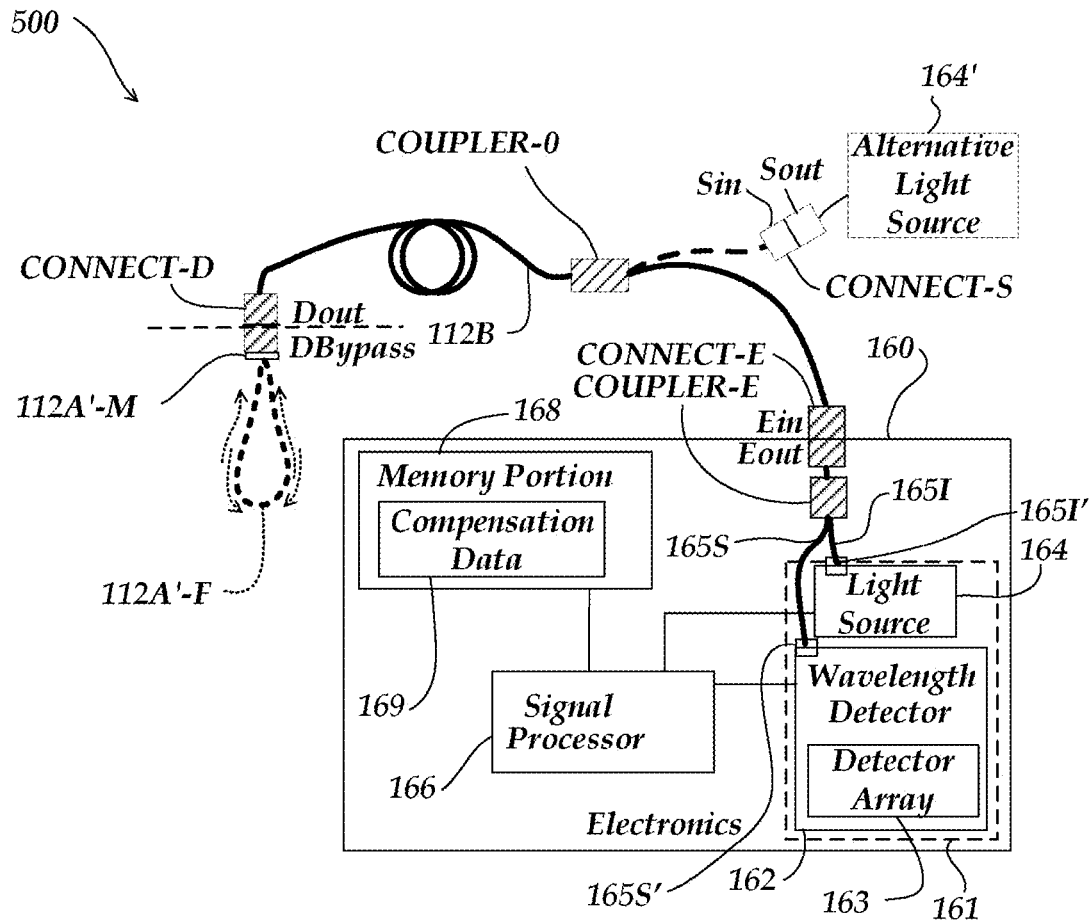
FIG. 5 is a diagram illustrating different configurations for coupling a light source to a wavelength detector while bypassing a CPS optical pen as part of an error compensation factor determination process in accordance with the present invention.

FIG. 5 is a diagram 500 illustrating different configurations for coupling a light source to a wavelength detector while bypassing a CPS optical pen as part of an error compensation factor determination process in accordance with the present invention. In particular, the embodiment shown in FIG. 5 includes the electronics portion 160 and the optical path components previously described with reference to FIG. 1. The operation of these components may be understood based on previous description. In contrast, the connector portion Din, the optical fiber segment 112A, and the optical pen 120 of FIG. 1 have been replaced by the connector portion DBypass and a bypass optical path 112A'. The bypass optical path 112A' may be implemented as one of the alternative bypass optical paths 112A'-M or 112A'-F, as described further below. In a first implementation, the bypass optical path 112A'-M is present, and 112A'-F is absent. The bypass optical path 112A'-M comprises a mirror element mounted to the connector portion DBypass, such that light transmitted along the optical path from the light source 164 to the mirror 112A'-M is reflected back into the optical path and returned to the wavelength detector 162, where it forms a raw intensity profile, as described in greater detail below. In a second implementation, the bypass optical path 112A'-F is present, and 112A'-M is absent. The bypass optical path 112A'-F comprises an optical fiber loop mounted to the connector portion DBypass, such that bypass light transmitted along the optical path from the light source 164 circulates around the optical fiber loop 112A'-F and back into the optical path and is returned to the wavelength detector 162, where it forms a raw intensity profile, as described below with reference to FIG. 6. It will be appreciated that the bypass mechanism 135 in the optical pen 120 shown in FIG. 1 provides another alternative means of reflecting light from the light source 164 to the wavelength detector 162 without substantially altering the relative intensities of the source light wavelengths. Thus, the bypass mechanism 135 provides another type of bypass optical path that may form the desired raw intensity profile for bypass light on the wavelength detector. It will be appreciated that in other implementations, the connector portion DBypass may be connected to the connector portion Eout to provide a raw intensity profile while bypassing not only the optical pen, but much of the optical path, if desired. Alternatively, the connection points 165I' and 165S' may be configured to be accessible, and the light source 164 may be connected directly to the wavelength detector 162 by an optical fiber connected at the connection points 165I' and 165S'. However, it will be appreciated that this may be less representative of normal operation compared to using at least a portion of the optical path including the optical fiber segment 112B (and its inherent internal scattering and attenuation) as outlined above.

Also shown in FIG. 5 is the alternative light source 164', which may be connected to a CPS system through a connector CONNECT-S, as shown. In some embodiments, alternative light source 164' may simply be considered an "external" light source used with a CPS (with appropriate control lines, not shown), and the "internal" light source 164 may be eliminated. In other embodiments, alternative light source 164' may be a standardized or reference light source, provided so that raw intensity profiles from the light sources 164 and 164' may be acquired and compared, as a means of calibrating the light source 164, and/or the wavelength detector 162. An alternative light source 164' that is a standardized or reference light source may also be used for calibrating the optical pen 120 and/or the wavelength detector 162.

Figure 6:
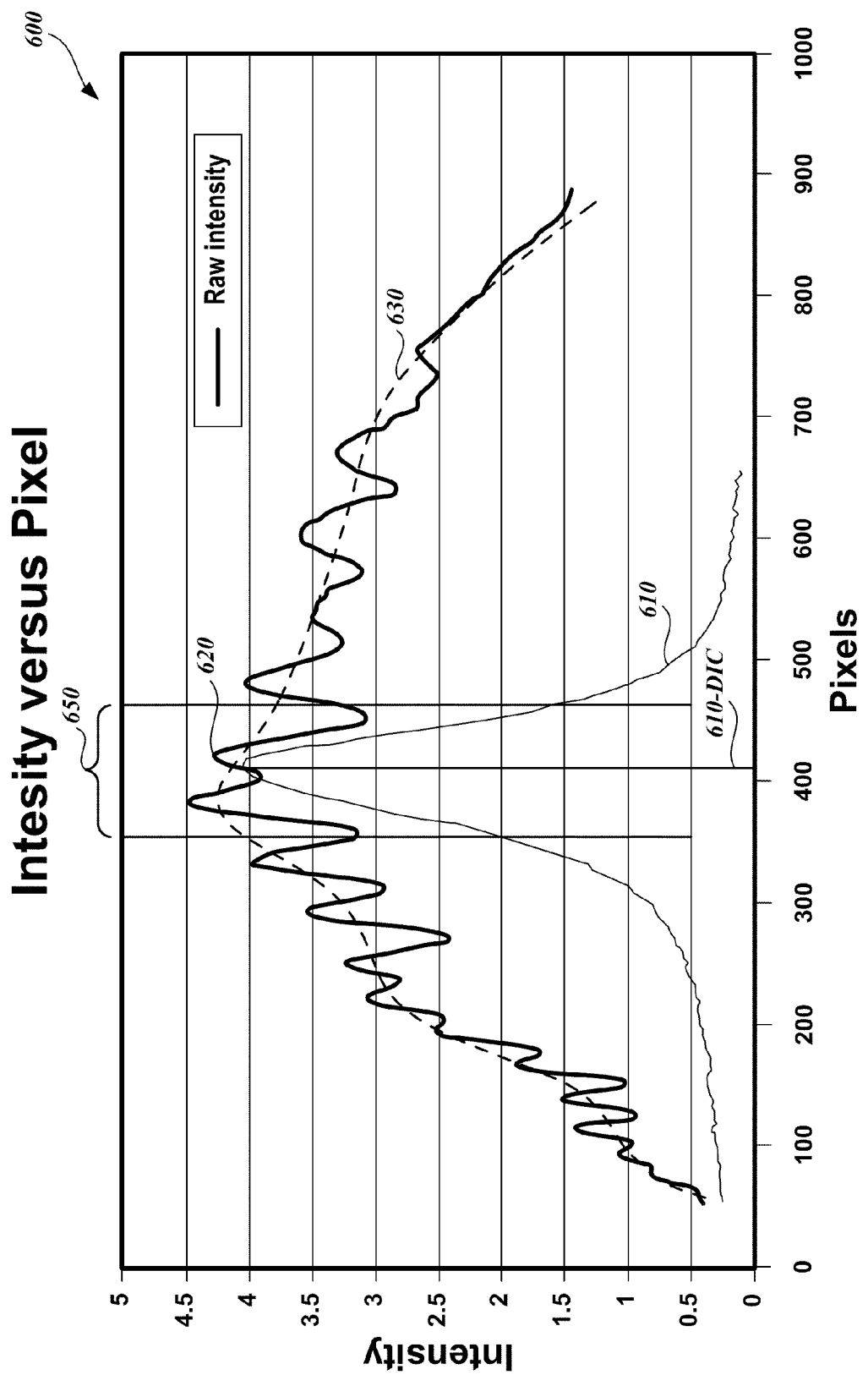
FIG. 6 is a diagram of a graph illustrating a raw intensity profile signals for a CPS source+detector subsystem, as well as a signal component attributed to the CPS light source and representative ideal peak region signal corresponding to a measurement distance indicating coordinate.

FIG. 6 is a diagram of a graph 600 illustrating raw intensity profile signal 620 for a CPS source+detector subsystem, as well as a long-range signal variation component 630 attributed to the CPS light source, and representative ideal measurement profile signal data 610 corresponding to a measurement distance indicating coordinate 610-DIC. The raw intensity profile signal 620 is acquired by bypassing the optical pen, for example using one of the configurations previously outlined with reference to FIG. 5, or the bypass mechanism 135. For purposes of explanation, we may define the raw intensity profile signal 620 to be a set of signals $SDSS_P^{RAW}$ that characterize the source+detector subsystem 161, approximately as follows:

$$SDSS_P^{RAW} = SI_P^{RAW} * DG_P^{RAW} \quad \text{(Eq. 4)}$$

For future reference, we may substitute EQUATION 4 into EQUATION 3 and write:

$$MS_P^{RAW}(Z) = SDSS_P^{RAW} * KPEN_P(Z) \quad \text{(Eq. 5)}$$

It will be appreciated that the long-range signal variation component 630 is not actually detected individually by the wavelength detector 162. Rather, it is an obscured signal component, which may be attributed to the CPS light source in various embodiments and correspond to the term $SI_P^{RAW}$ in EQUATION 4, and it is illustrated here for purposes of explanation. As previously outlined, $SI_P^{RAW}$ describes the relative or normalized intensities of the wavelengths included in the broadband light of a CPS light source. As will be described further below, if not compensated, the wavelength-dependent intensity variations of $SI_P^{RAW}$ may lead to errors in determining distance indicating coordinates, as outlined below with reference to FIGS. 8A-8C. Because the long-range signal variation component 630 including the light source intensity variation varies relatively smoothly over a long range (e.g., as shown in FIG. 6), it also be referred to as a "long range" raw intensity profile signal variation, or a long range characteristic of a CPS system or profile, and associated with "long range" error components or factors, or the like.

The raw intensity profile signal 620 also includes a "short range" raw intensity profile signal variation that is wavelength-dependent and that varies relatively abruptly and significantly about the long-range signal variation component 630, and which may correspond to or be encompassed within the term $DG_P^{RAW}$ in EQUATION 4. As previously outlined, $DG_P^{RAW}$ may describe the relative or normalized signal gain associated with each pixel of a wavelength detector. Such short range variations may lead to errors in determining distance indicating coordinates as outlined below with reference to FIGS. 8A-8C. Such variations may be referred to as a "short range" raw intensity profile signal variation, or a short range characteristic of a CPS system or profile, and associated with "short range" error components or factors, or the like. Potential causes of a short range wavelength-dependent signal variation and its effects on a CPS system are described in greater detail below with reference to FIGS. 7 and 8.

According to the description above, it should be appreciated that although the long-range signal variation component 630 may be interpreted as approximately reflecting the wavelength-dependent intensity variations of CPS light source in some embodiments, it may also be approximately equivalent to the signal remaining after short range signal variations are removed from the raw intensity profile signal 620. Therefore, in some contexts we may also refer to the long-range signal variation component 630 as the short-range compensated signal 630.

The ideal measurement profile signal data 610 corresponds to the term $KPEN_P(Z)$, shown in EQUATIONS 5 and 3, which may be thought of as a distance-dependent transfer function of the CPS pen for each wavelength (or its corresponding detector pixel), as previously indicated. It should be emphasized that the ideal measurement profile signal data 610 and the corresponding measurement distance indicating coordinate 610-DIC are not included in the signal 620. Rather, they are provided in FIG. 6 only to support an explanation of some features of this invention, based on a segment 650 of the graph 600. The explanation based on the segment 650 is continued below with reference to FIG. 8.

Figure 7:
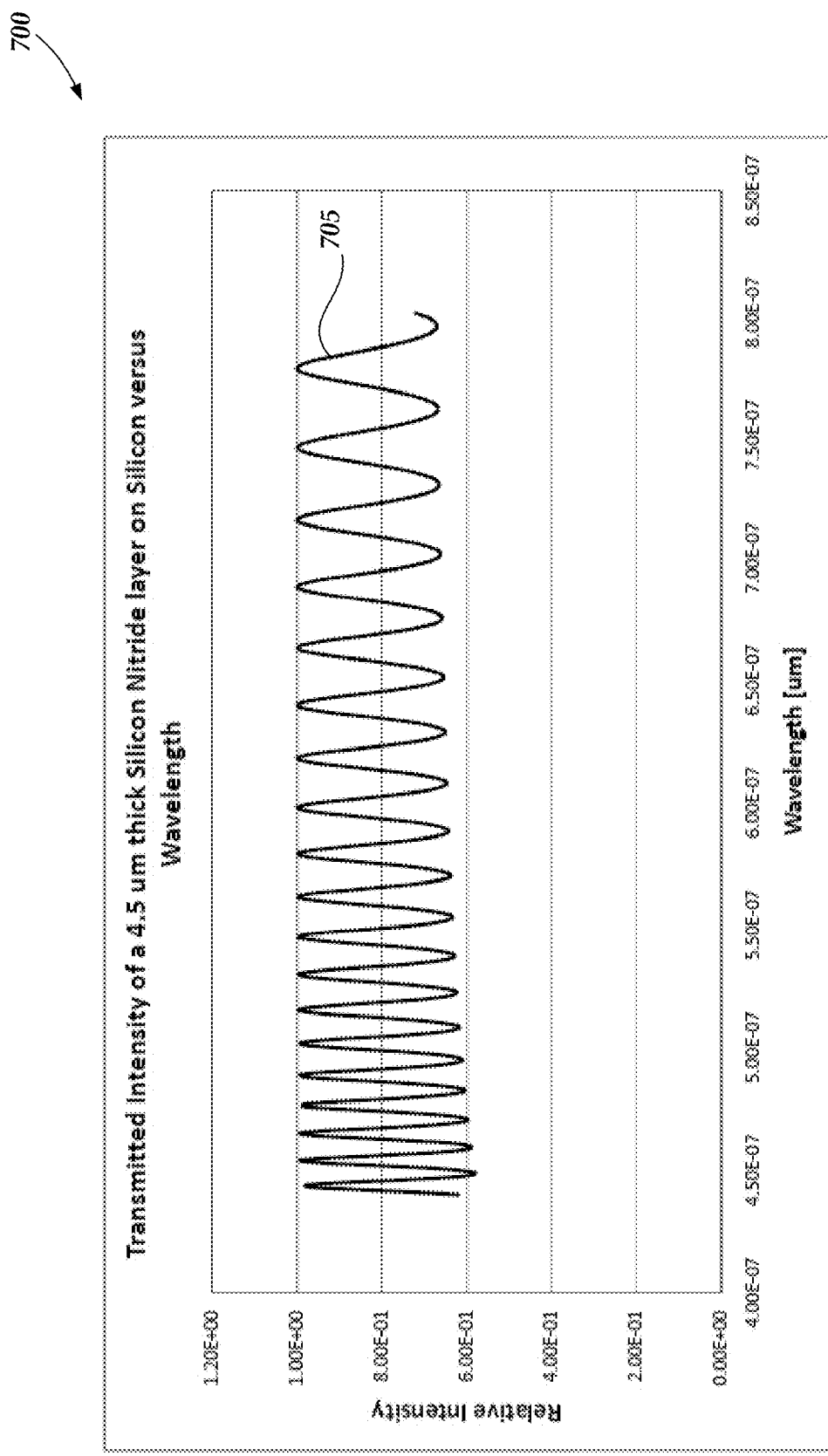
FIG. 7 is a diagram of a graph illustrating a simulation of interference effects which introduce short range wavelength-dependent variations in light intensity detected by a chromatic point sensor detector.

FIG. 7 is a diagram of a graph 700 illustrating a known type of simulation of interference effect data 705, which may contribute to short range wavelength-dependent variation in the apparent pixel signal gains of CPS wavelength detector, corresponding to the wavelength-dependent short range raw intensity profile signal variation seen in the raw intensity profile signal 620 of FIG. 6. In one specific example implementation, the graph 700 is representative of the wavelength-dependent light transmission variation due to thin film interference effects through a 4.5 um thick silicon nitride film on a silicon substrate, which is a configuration one may encounter when using a low cost commercially available CMOS detector array in a CPS wavelength detector, for example. There are also other factors which may cause short range variations in the apparent pixel gains of wavelength detector array (e.g., the detector array 163), including wave-length and/or spatially dependent variations in transmissions by a dispersive element and other optics, pixel-to-pixel responsively variations such as pixel response non-uniformity (PRNU), short range non-uniformity of a light source spectral profile, etc. Regardless of the cause of such short range variations, they may lead to errors in determining distance indicating coordinates as outlined below with reference to FIG. 8.

FIGS. 8A-8C are diagrams 800A-800C including the segment 650 of the graph of FIG. 6, including the raw intensity profile signal 620 for a CPS source+detector subsystem, the short-range compensated signal 630, the representative ideal measurement profile signal data 610 and its corresponding ideal distance indicating coordinate 610-DIC, as previously described. FIGS. 89A-8C illustrate the effects of short range and long range error components outlined with reference to FIG. 6 on distance indicating coordinates determined based on a peak region of measurement profile signal data.

Figure 8:
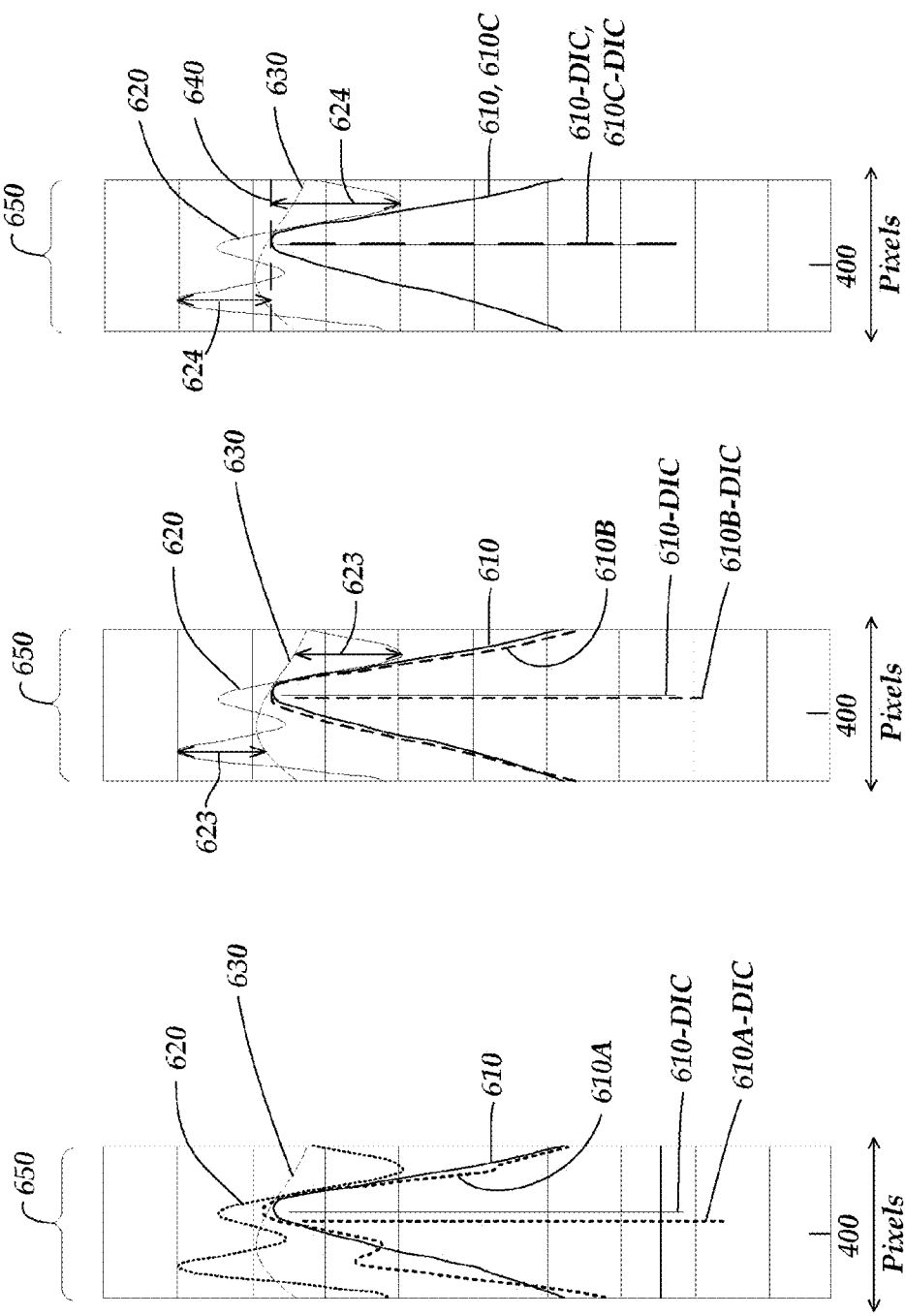
FIGS. 8A-8C are diagrams of a selected portion of the graph of FIG. 6 illustrating the effects of short range and long range raw intensity profile signal components on the distance indicating coordinate determined for a peak region signal corresponding to a measurement distance indicating coordinate.

As previously indicated, the raw intensity profile signal 620 corresponds to a set of signals $SDSS_P^{RAW}$ that characterizes the source+detector subsystem 161, and the ideal measurement profile signal data 610 to corresponds to the term $KPEN_P(K)$, which may be thought of as a distance-dependent transfer function of the CPS pen for each wavelength (or its corresponding detector pixel). When these terms are appropriately normalized, according to EQUATION 5, their product describes a set of raw measurement profile signal data $MS_P^{RAW}(Z)$ that is produced by the CPS source+detector subsystem 161 for a workpiece surface at the distance Z from the CPS pen 120, which is illustrated as the raw measurement profile signal data 610A in FIG. 8A. As shown in FIG. 8A the wavelength-dependent variations in particular source+detector subsystem 161 (as reflected in the signal 620), cause corresponding unique irregularities and asymmetry in the shape of the peak region of the raw measurement profile signal data 610A, distorting it in a unique manner relative to the peak region of the ideal measurement profile signal data 610 that corresponds to the distance-dependent CPS pen transfer function term $KPEN_P(Z)$. Of course a distance indicating coordinate 610A-DIC determined for the uniquely distorted raw measurement profile signal data 610A will be source+detector subsystem specific, and will disagree with the distance indicating coordinate 610-DIC corresponding to the undistorted ideal measurement profile signal data 610. The magnitude of this disagreement for relatively wide peak regions, which are subject to considerable distortion and asymmetry, has not been adequately considered from the standpoint of system robustness and/or calibration in prior art systems. For example, note that a relatively small shift in the location of the measurement profile signal data 610 (e.g., a shift 20 pixels to the left in FIGS. 6 and 8), which corresponds to a relatively small change in Z, would drastically change the shape of the raw measurement profile signal data 610A. The relative location of the resulting distance indicating coordinate would thus change rather erratically compared to the small change in Z. If peak regions are assumed to be relative narrow, the significance of such shape distortions and asymmetries are not accounted for (e.g., a peak a few pixels wide does not exhibit significant distortion, a peak region 1 pixel wide cannot exhibit distortion or asymmetry, and so on.)

FIG. 8B illustrates the results of an improved signal processing method in comparison to that associated with the prior art raw measurement profile signal data 610A of FIG. 8A. In FIG. 8B, the short range variation of the signals $SDSS_P^{RAW}$ that characterize the source+detector subsystem 161 (e.g., the short range variations 623 reflected in the signal 620) are removed or compensated, as described further below, such that only the long range variations (e.g., as reflected in the signal 630) cause distortion in the resulting short-range compensated measurement profile signal data 610B of FIG. 8B. Using previously defined naming conventions, the short-range compensated signal 630 corresponds to a set of signals $SDSS_P^{SRCOMP}$, and the short-range compensated measurement profile signal data 610B corresponds to a set of signals $MS_P^{SRCOMP}(Z)$:

$$MS_P^{SRCOMP}(Z)=SDSS_P^{SRCOMP}*KPEN_P(Z) \qquad (Eq.\ 6)$$

As shown in FIG. 8B, peak region of the short-range compensated measurement profile signal data 610B, which corresponds to the set of signals $MS_P^{SRCOMP}(Z)$, exhibits much less shape distortion and asymmetry in comparison to the raw measurement profile signal data 610A of FIG. 8A. The distance indicating coordinate 610B-DIC corresponding to the short-range compensated measurement profile signal data 610B therefore more closely agrees with the distance indicating coordinate 610-DIC corresponding to the undistorted ideal measurement profile signal data 610. Furthermore, we may expect that a relatively small shift in the location of the measurement profile signal data 610, which corresponds to a relatively small change in Z, would not drastically change the shape of the short-range compensated measurement profile signal data 610B. Thus, the relative location of the resulting distance indicating coordinate would change more smoothly and predictably for small changes in Z.

In one embodiment, the signal data 620 may be filtered (e.g., as outlined below with reference to FIG. 9, or by other know filtering methods) to identify the short-range compensated (or short-range filtered) signal 630 that excludes the significant short range variations 623. In such an embodiment, we may define the short-range compensated signals $SDSS_P^{SRCOMP}$ (e.g., the signals 630) by mathematical operations, based on the raw intensity profile signals $SDSS_P^{RAW}$ (e.g., the signals 620), which may be acquired by pen-bypassing operations, such as those outlined with reference to FIGS. 5 and 6, for example. For future reference, we define a set of short range error compensation factors $KSRCOMP_P$ that may be based on these signals:

$$KSRCOMP_P = \frac{SDSS_P^{SRCOMP}}{SDSS_P^{RAW}} \quad \text{(Eq. 7)}$$

Using the relationship of EQUATION 7, we may rewrite EQUATION 6 as:

$$MS_P^{SRCOMP}(Z) = KSRCOMP_P * (SDSS_P^{RAW} * KPEN_P(Z)) \quad \text{(Eq. 8)}$$

Combining EQUATIONS 8 and 5:

$$MS_P^{SRCOMP}(Z) = KSRCOMP_P * MS_P^{RAW}(Z) \quad \text{(Eq. 9)}$$

Thus, according to EQUATION 9, in some embodiments, we may establish a set of short range error compensation factors $KSRCOMP_P$ for a source+detector subsystem 161 and thereafter compensate the raw measurement profiles signals from that source+detector subsystem 161 to provide short-range compensated measurement profile signals $MS_P^{SRCOMP}(Z)$. In various embodiments, distance indicating coordinates based on such short-range compensated measurement profile signals as outlined above are advantageous in that they may be more accurate, and may vary more smoothly as a function of Z, in comparison to distance indicating coordinates based on raw measurement profile signals. Among other benefits, it should be appreciated that when the distance indicating coordinates vary more smoothly as a function of Z, that corresponds to the distance calibration data 410 shown in FIG. 4 changing more smoothly, which implies that fewer distance calibration data may suffice for establishing an accurate distance calibration curve (which may allow more economical lab or field calibration methods) and/or that subpixel interpolation for establishing a measurement distance indicating coordinate may be simplified or made more accurate. In addition, after determining the short range error compensation factors $KSRCOMP_P$ a first time, they may easily be determined a second time in the field as a basis for analyzing drift or defects in the CPS source+detector subsystem 161, and/or related error correction or recalibration of the short range error compensation factors.

FIG. 8C illustrates the results of an improved signal processing method that compensates the short range variations compensated in the method outlined with reference to FIG. 8B, and in addition compensates long range variations associated with a CPS source+detector subsystem 161. In FIG. 8C, the combined short range and long range variation of the signals $SDSS_P^{RAW}$ that characterize the source+detector subsystem 161 (e.g., the combined short range and long range variations 624 reflected in the signal 620) are removed or compensated relative to a designated or reference level (e.g., that of the combined short range and long range compensated signal 640 shown in FIG. 8C.) Such combined short range and long range compensation is also referred to as overall compensation herein. Using previously defined naming conventions, the overall compensated signal 640 corresponds to a set of overall compensated signals $SDSS_P^{COMBCOMP}$, and the overall compensated measurement profile signal data 610C corresponds to a set of signals $MS_P^{COMBCOMP}(Z)$:

$$MS_P^{COMBCOMP}(Z) = SDSS_P^{COMBCOMP} * KPEN_P(Z) \quad \text{(Eq. 10)}$$

As shown in FIG. 8C, the peak region of the overall compensated measurement profile signal data 610C, which corresponds to the set of signals $MS_P^{SRCOMP}(Z)$, exhibits no shape distortion or asymmetry in comparison to the ideal measurement profile signal data 610, and their distance indicating coordinates 610-DIC and 610C-DIC coincide. Thus, we may expect that the location of the resulting distance indicating coordinate would change even more smoothly and predictably for changes in Z than previously outlined for the distance indicating coordinate 610B-DIC of FIG. 8B.

In one embodiment, a prescribed function or constant value may be used to define the overall compensated signals $SDSS_P^{COMBCOMP}$ (e.g., the overall compensated signals 640) that exclude the significant short range and long range variations 624. Using these values in combination with values P determined as previously outlined, we may define a set of overall error compensation factors $KCOMBCOMP_P$:

$$KCOMBCOMP_P = \frac{SDSS_P^{COMBCOMP}}{SDSS_P^{RAW}} \quad \text{(Eq. 11)}$$

Using the relationship of EQUATION 11, we may rewrite EQUATION 10 as:

$$MS_P^{COMBCOMP}(Z) = KCOMBCOMP_P * (SDSS_P^{RAW} * KPEN_P(Z)) \quad \text{(Eq. 12)}$$

Combining EQUATIONS 12 and 5:

$$MS_P^{COMBCOMP}(Z) = KCOMBCOMP_P * MS_P^{RAW}(Z) \quad \text{(Eq. 13)}$$

Thus, according to EQUATION 13, we may establish a set of overall error compensation factors $KCOMBCOMP_P$ for a source+detector subsystem 161 and thereafter compensate the raw measurement profiles signals from that source+detector subsystem 161 to provide overall compensated measurement profile signals $MS_P^{COMBCOMP}(Z)$. It should be appreciated that in some embodiments, if CPS system is constructed such that wavelength-dependent short range variations or long range variations may be insignificant. Thus, a set of overall error compensation factors determined as outlined above may be interpreted as compensating primarily whatever errors are significant, e.g., they may also serve as primarily short range error compensation factors, or long range error compensation factors in various embodiments.

As outlined above, distance indicating coordinates based on such overall compensated measurement profile signals are advantageous in that they may be more accurate in some embodiments and may vary more smoothly as a function of Z, in comparison to distance indicating coordinates based on raw measurement profile signals, which provides previously outlined benefits. In addition, after determining the overall error compensation factors $KCOMBCOMP_P$ a first time, they may easily be determined a second time in the field as a basis for analyzing drift or defects in the CPS source+detector subsystem 161, and/or related error correction or recalibration of the overall error compensation factors. Furthermore, it should be appreciated that if the same prescribed function or constant value is used to define the overall compensated signals $SDSS_P^{SRCOMP}$ for more than one source+detector subsystem 161, then the overall error compensation factors $KCOMBCOMP_P$ will operate to make such source+detector subsystems nominally interchangeable (e.g., the set of values $MS_P^{COMBCOMP}(Z)$ shown in EQUATIONS 12 and 13 will be nominally the same when using either such source+detector subsystem in a CPS).

Regarding the foregoing statement regarding interchangeability, for the best CPS accuracy with interchanged subsystems, it is best to insure that the wavelength detectors of each of the interchanged subsystems have the same wavelength response (that is, corresponding pixels in the wavelength detector of each subsystem should receive nominally the same wavelength of light.) If the same wavelength detector is used, and only the light source is changed in a source+detector subsystem, then this condition is inherently fulfilled. Thus, using the methods disclosed here, a light source may be replaced in a CPS and that CPS may be accurately "recalibrated" by determining new overall error compensation factors $KCOMBCOMP_P$, entirely in the field, without the need for external calibration references. Otherwise, if the interchange includes changing the wavelength detector, the same detector wavelength response may be insured by various known design, adjustment, and/or calibration methods, if it is desired to maintain the best possible CPS accuracy. In one embodiment, the same wavelength response may be provided, in effect, by determining the raw wavelength response of each detector using known wavelengths of light, and converting or mapping their raw wavelength response to a desired or standardized wavelength response (e.g., a defined correspondence between pixel position and wavelength).

Figure 9:
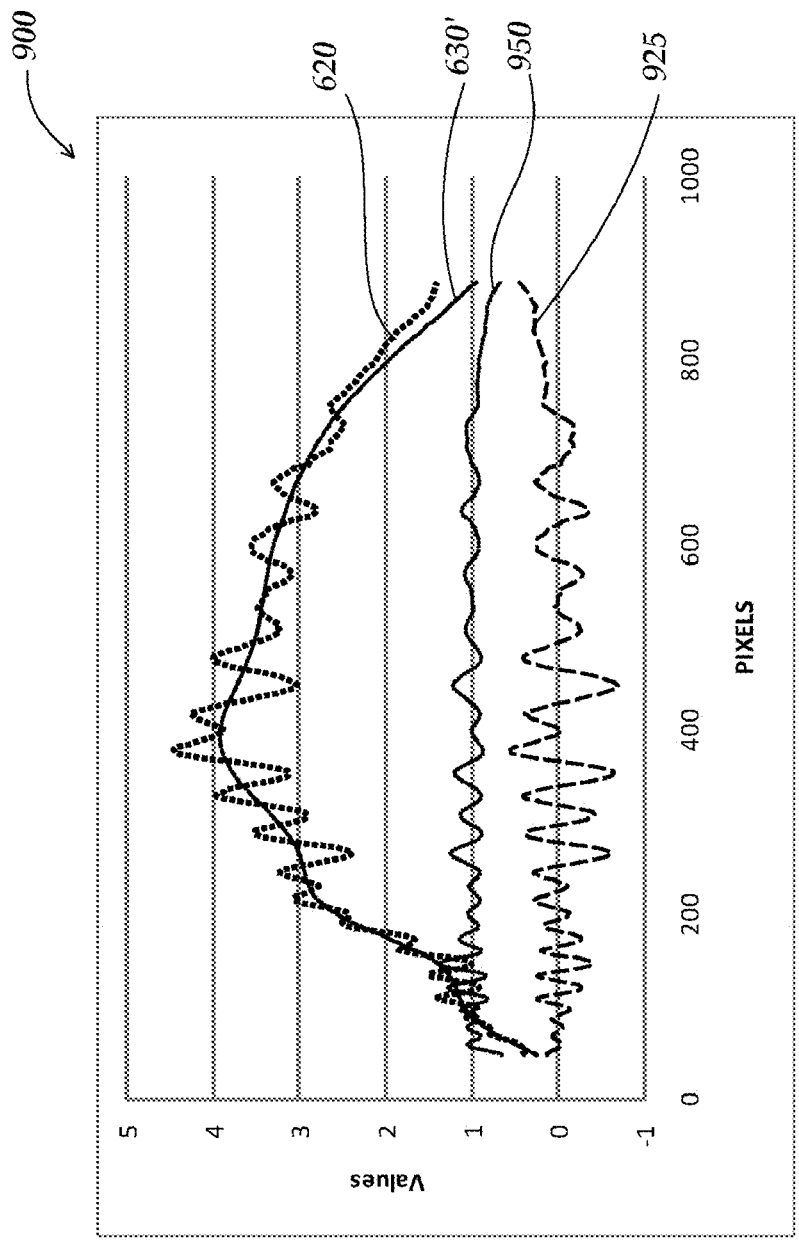
FIG. 9 is a diagram of a graph illustrating a raw intensity profile signal, and further illustrating a filtered signal component related to short range error compensation and short range error compensation factors derived in accordance with an error compensation method according to one embodiment of this invention.

FIG. 9 illustrates a second embodiment of a method for performing short-range error compensation in order to provide a set of short-range compensated measurement profile signals $MS_P^{SRCOMP}(Z)$ and/or implement EQUATIONS 6-9 in manner analogous to that previously outlined with reference to FIG. 8B. In particular, FIG. 9 includes a diagram of a graph 900 illustrating the raw intensity profile signal data 620 shown in FIG. 6, which may be acquired as previously described with reference to FIG. 5. FIG. 9 also shows a short-range compensated signal 630', short range variation data 925, and short range error compensation factors 950, determined as described below.

In the particular embodiment shown in FIG. 9, the short-range compensated signal 630' is determined by applying mathematical operations to the raw intensity profile signal data 620, approximately as follows. An Equi-Ripple High Pass VI filter available in the commercial computer program LabView® is applied to the raw intensity profile signal data 620. This generates a highpass finite impulse response (FIR) digital filter with equi-ripple characteristics using the Parks-McClellan algorithm (# of taps=101, Stop Frequency 0.0025, High Frequency=0.025, and sampling freq=1). The Equi-Ripple High Pass VI filter operations apply a linear-phase, highpass filter to the intensity input sequence using the Convolution High Pass VI filter of LabView® to obtain the high pass filtered data. After the taps are removed from the high pass filtered data, the input and output data are interpolated and indexed to each pixel value p resulting in the short range variation data 925, which is analogous to the short range variations 623 shown in FIG. 8B. The short-range compensated signal 630', which is analogous to the short-range compensated signal 630 shown in FIG. 8B (and the corresponding signals $SDSS_P^{SRCOMP}$) may then be determined for each pixel by subtracting the value of the short range variation data 925 at a pixel p from the value of the raw intensity profile signal data 620 (which correspond to the signals $SDSS_P^{RAW}$) at that pixel. The value of the short range error compensation factors 950 (the current implementation of the short range error compensation factors $KSRCOMP_P$), may then be determined according to EQUATION 7, which is repeated here for convenience:

$$KSRCOMP_P = \frac{SDSS_P^{SRCOMP}}{SDSS_P^{RAW}} \quad \text{(Eq. 7)}$$

These short range error compensation factors may then be applied to provide a set of short-range compensated measurement profile signals $MS_P^{SRCOMP}(Z)$ prior to determining their corresponding distance indicating coordinate, in order to produce the various benefits outline previously with reference to FIG. 8B and EQUATIONS 6-9.

Figure 10A:
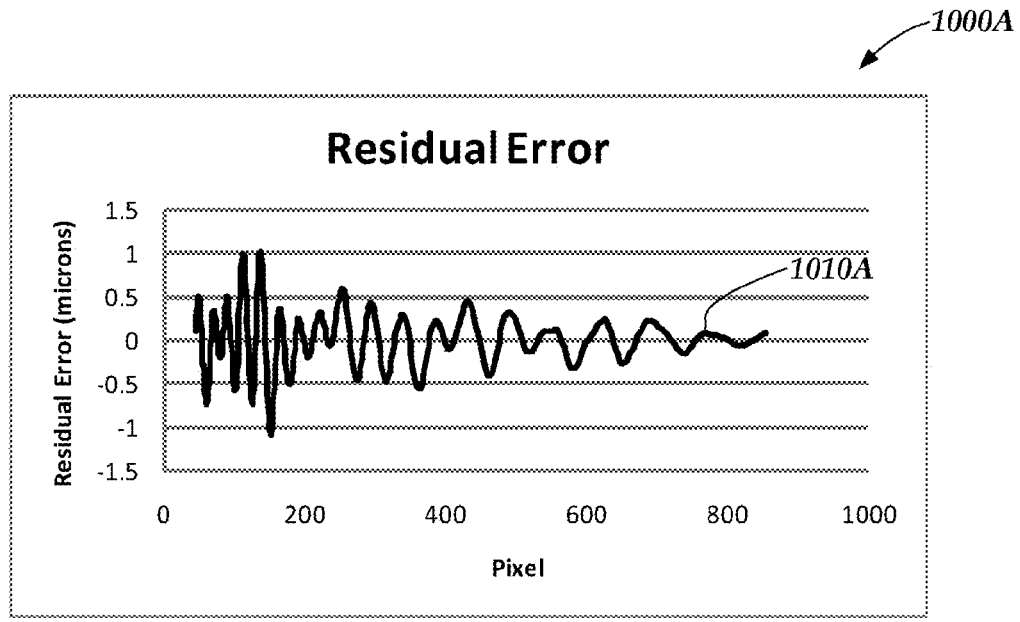
FIGS. 10A and 10B are diagrams of graphs indicative of the smoothness of a distance calibration curve for a prior art CPS system, and a CPS system using short range error compensation factors according to one embodiment of this invention, respectively.
Figure 10B:
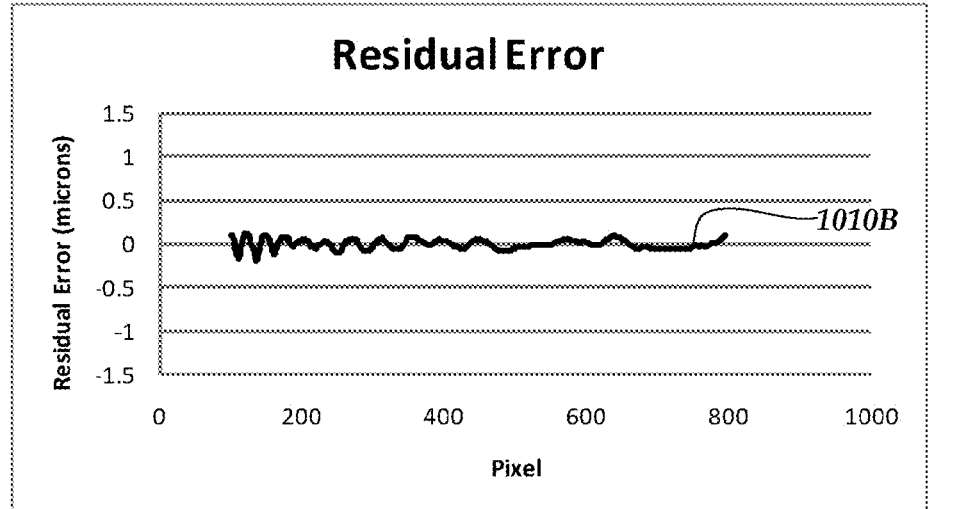

FIGS. 10A and 10B are diagrams of graphs 1000A and 1000B that compare the smoothness of distance calibration data (e.g., similar to the distance calibration data 410 of FIG. 4) for a prior art CPS system, and a CPS system using short range error compensation factors according to one embodiment of this invention, respectively. In particular, the residual errors 1010A shown in FIG. 1000A depict the deviation between a set of distance calibration data similar to the data 410 and an $8^{th}$ order polynomial fit to that data, when the distance calibration data comprises distance indicating coordinates determined according to EQUATION 1, as applied to raw measurement profile signal data $MS_P^{RAW}(Z)$. As shown in FIG. 10A, the residual errors 1010A are on the order of a micron (for a 300 micron measuring range), and vary relatively erratically, for reasons previously described with reference to FIG. 8A. For comparison, the residual errors 1010B shown in FIG. 1000B depict the deviation between a set of distance calibration data similar to the data 410 and an $8^{th}$ order polynomial fit to that data, when the distance calibration data comprises distance indicating coordinates determined according to EQUATION 1, as applied to short-range compensated measurement profile signal data $MS_P^{SRCOMP}(Z)$, which is compensated approximately as previously outlined with reference to FIG. 9. As shown in FIGURE 10B, the residual errors 1010B are on the order 5-10 times smaller than those shown in FIG. 1000A, for reasons previously described with reference to FIG. 8B. Of course the same behavior will be reflected in workpiece distance measurement data as is shown here for distance calibration data. As previously indicated, among other benefits, when distance indicating coordinates vary more smoothly as a function of Z, fewer distance calibration data may suffice for establishing an accurate distance calibration curve (which may allow more economical lab or field calibration methods), and/or sub-pixel interpolation for establishing a high resolution measurement distance indicating coordinate (e.g., on the order of $\frac{1}{100}^{th}$ of a pixel) may be simplified or made more accurate.

Figure 11:
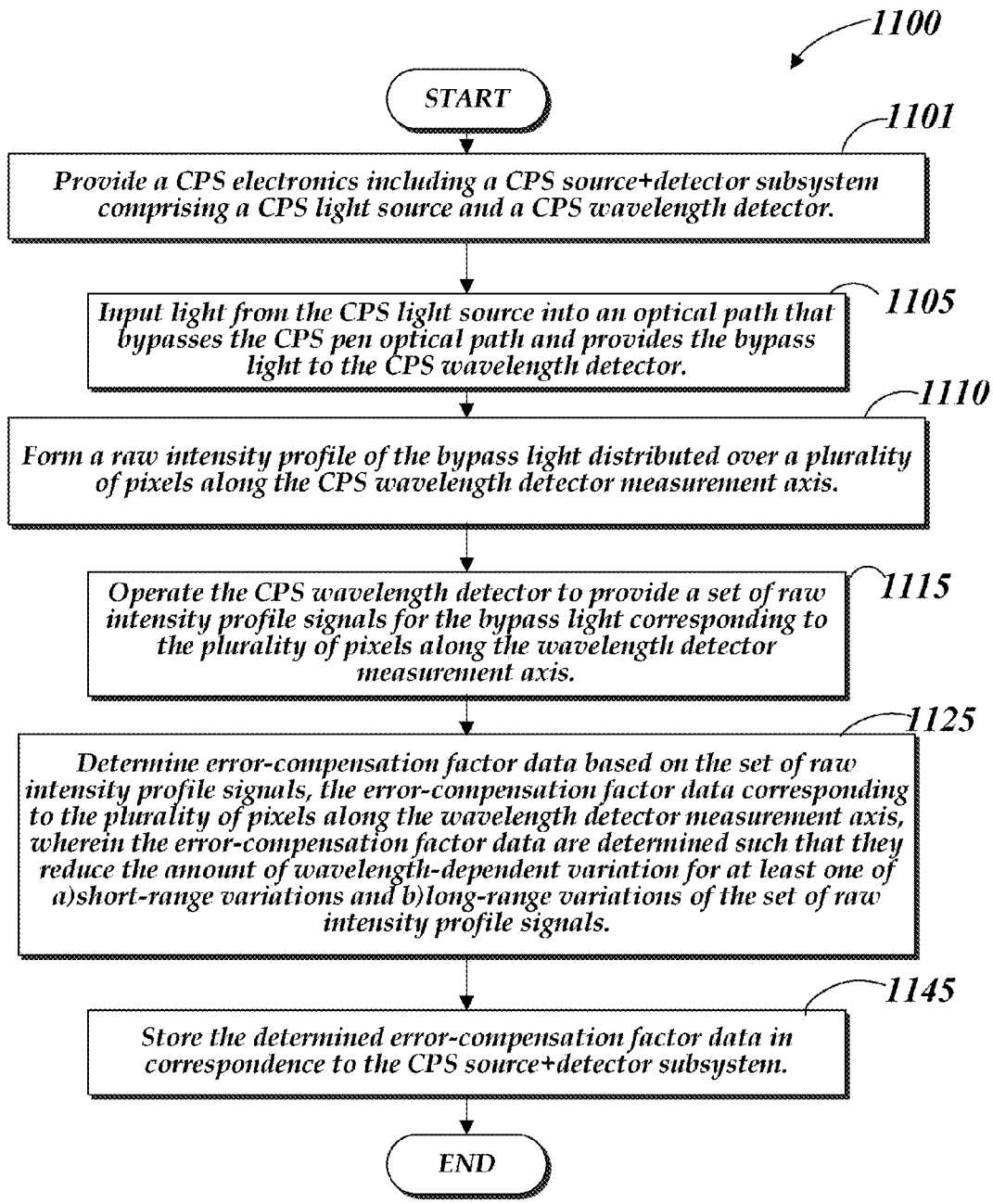
FIG. 11 is a flow diagram illustrating an exemplary routine for a first embodiment of an error compensation factor determination method of the present invention.

FIG. 11 is a flow diagram illustrating an exemplary routine 1100 for a first embodiment of an error compensation factor determination method of the present invention. In some embodiments, methods for error compensation factor determination according to this invention may be implemented by operations of the CPS electronics (e.g., by execution of routines residing in memory portion 168, as implemented under control of the signal processor 166.) The CPS electronics may include a means for activating an error compensation factor determination mode, in contrast to the normal measuring operation mode of the CPS, if desired. In other embodiments, methods for error compensation factor determination according to this invention may be implemented by operations a host system (e.g., a general purpose personal computer) connected to and interacting with the CPS electronics. As shown in FIG. 11, at a block 1101, a CPS electronics including a CPS source+detector subsystem comprising a CPS light source and a CPS wavelength detector are provided. At a block 1105, light from the CPS light source is input into an optical path that bypasses the CPS pen optical path and provides the bypass light to the CPS wavelength detector (e.g., as previously outlined with reference to FIG. 5). At a block 1110, the bypass light provided to the wavelength detector forms a raw intensity profile distributed over a plurality of pixels along the CPS wavelength detector measurement axis (e.g., along a detector array of the wavelength detector). In various embodiments, the plurality of pixels comprises at least a majority of the pixels of the CPS wavelength detector and/or each pixel within a pixel range that receives light during normal measurement operations of the CPS.

At a block 1115, the CPS wavelength detector is operated to provide a set of raw intensity profile signals arising from the bypass light and corresponding to the plurality of pixels along the wavelength detector measurement axis (e.g., in a manner similar to that previously outlined with reference to the raw intensity profile signals 620 of FIG. 6, in one embodiment.) As previously outlined, the raw intensity profile signals include a signal component related to the intensity of the bypass light which is distributed over the plurality of pixels. At a block 1125, error-compensation factor data are determined based on the set of raw intensity profile signals provided at block 1115. The error-compensation factor data correspond to the plurality of pixels along the wavelength detector measurement axis, and are determined such that they reduce the amount of wavelength-dependent variation for at least one of short-range variations and long-range variations included in the set of raw intensity profile signals. At a block 1145, the determined error-compensation factor data are stored in correspondence to the CPS source+detector subsystem, for later application. In various embodiments, the stored error-compensation factor data is later applied to reduce the amount of wavelength-dependent variation for at least one of a) short-range variations and b) long-range variations included in intensity profile signals arising during normal workpiece measuring operations of the CPS electronics. In one embodiment, the error-compensation factor data may be stored in the form of a lookup table. However, in other embodiments, the error-compensation factor data may be provided in any convenient and functionally analogous form (e.g., in the form of a polynomial function, or the like). In one embodiment, the error-compensation factor data may be determined and applied to provide short-range error compensation as previously outlined with reference to FIG. 8B and/or FIG. 9, and/or EQUATIONS 7-9. In other embodiments, the error-compensation factor data may determined and applied to provide long-range and/or overall error compensation as previously outlined with reference to FIG. 8C and/or EQUATIONS 11-13.

Figure 12:
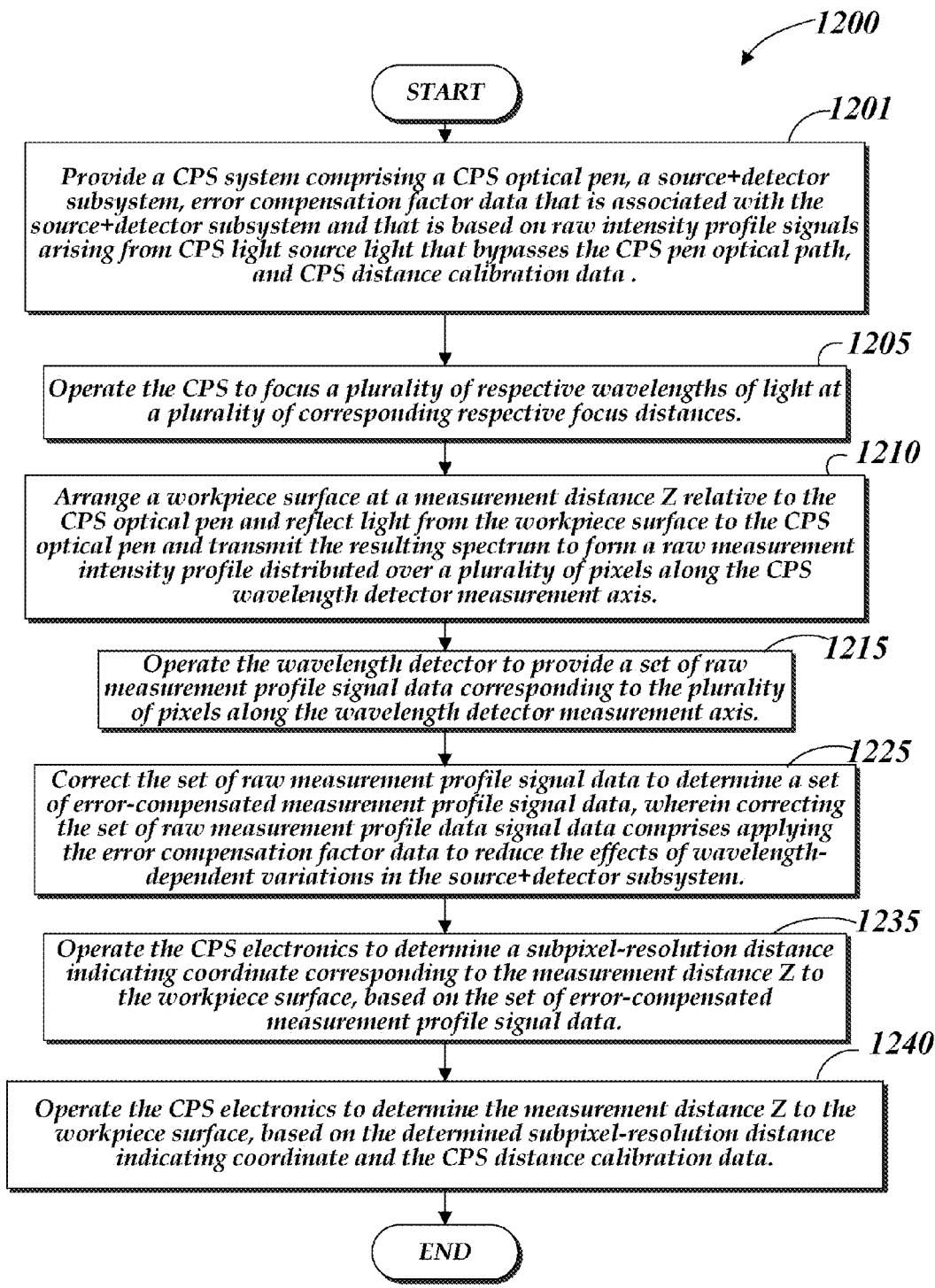
FIG. 12 is a flow diagram illustrating an exemplary routine for operating a chromatic point sensor using the error compensation factor data generated in FIG. 11.

FIG. 12 is a flow diagram illustrating an exemplary routine 1200 for operating a chromatic point sensor using the error compensation factor data generated in the routine 1100 of FIG. 11. As shown in FIG. 12, at a block 1201, a CPS system is provided comprising a CPS optical pen, a source+detector subsystem (comprising a CPS light source and wavelength detector), error compensation factor data that corresponds to the source+detector subsystem and that is based on raw intensity profile signals arising from CPS light source light that bypasses the CPS pen optical path, and CPS distance calibration data. In various embodiments the error compensation factor data may comprise short range error compensation factors, long range error compensation factors, or overall error compensation factors—determined according to teachings previously outlined herein. In some embodiments, the compensation factor data may be expressed and/or stored in terms of one or more formulas that generate the desired error compensation factors as needed, rather than as a set of predetermined discrete error compensation factors. In various embodiments, the CPS distance calibration data is determined using the source+detector subsystem, and the distance indicating coordinates used in the CPS distance calibration data are based error-compensated measurement profile signal data that is error-compensated using the error compensation factor data of the CPS system. In one embodiment, the CPS distance calibration data may be stored in the form of a lookup table. However, in other embodiments, the CPS distance calibration data may be provided in any convenient and functionally analogous form (e.g., in the form of a polynomial function, or the like). In some embodiments, to achieve the best possible accuracy, the CPS distance calibration data may be determined using the same source+detector subsystem, and the distance indicating coordinates used in the CPS distance calibration data are based measurement profile signal data that is error compensated using the same error compensation factors. In other embodiments, the CPS distance calibration data may be determined using a different, but comparable, source+detector subsystem that is similarly calibrated or error compensated. The distance indicating coordinates used in the CPS distance calibration data may be based measurement profile signal data from the comparable source+detector subsystem. In this sense, a comparable source+detector subsystem is calibrated (e.g., adjusted) or error compensated to provide measurement profile signal data for determining calibration distance indicating coordinates that are comparable to the error-compensated measurement profile signal data provided by the current CPS electronics for determining measurement distance indicating coordinates. In one embodiment, this may be accomplished when the comparable source+detector subsystem used for calibration provides error-compensated measurement profile signal data based on error compensation factors determined relative to a standardized or reference set of profile signal data, and the current source+detector subsystem provides error-compensated measurement profile signal data based on error compensation factors determined relative to the same standardized or reference set of profile signal data. Alternatively, the comparable source+detector subsystem may be constructed and/or physically adjusted to provide approximately ideal signal data relative to the standardized or reference set of profile signal data, in which case error compensation is not necessary for that source+detector subsystem.

At a block 1205, the chromatic point sensor is operated to focus a plurality of respective wavelengths of light at a plurality of corresponding respective focus distances. In one embodiment, this corresponds to outputting broadband light through the chromatic point sensor optical pen, which produces longitudinal chromatic aberration so that its focal length depends on the wavelength of the light.

At a block 1210, a workpiece surface is arranged at a measurement distance Z relative to the optical pen and light is reflected from the workpiece surface to the optical pen and the resulting spectrum is transmitted to form a measurement intensity profile distributed over a plurality of pixels (e.g., along a detector array) along the CPS wavelength detector measurement axis. At a block 1215, the wavelength detector is operated to provide a set of raw measurement profile signal data corresponding to the plurality of pixels along the wavelength detector array measurement axis. In one embodiment, providing the set of set of raw measurement profile signal data corresponds to the pixels of the wavelength detector array outputting signals which correspond to the measurement intensity profile and compensating those to remove voltage offset errors as outlined previously with reference to FIG. 2, and providing the resulting signals as the set of raw measurement profile signal data.

At a block 1225, the set of raw measurement profile signal data are corrected to determine a set of error-compensated measurement profile signals, wherein correcting the set of raw measurement profile signal data comprises applying the error compensation factor data to reduce the effects of wavelength-dependent variations in the source+detector subsystem, according to methods previously outlined herein. In various embodiments, the effects of short range, and/or long range, and/or overall wavelength-dependent variations of the source+detector subsystem may be compensated and reduced.

At a block 1235, the CPS electronics are operated to determine a subpixel-resolution distance indicating coordinate corresponding to the measurement distance Z to the workpiece surface, based on the set of error-compensated measurement profile signal data determined at block 1225. In one embodiment, the subpixel-resolution distance indicating coordinate may be determined with subpixel resolution and accuracy as the centroid coordinate of a distance-indicating subset of the set of error-compensated measurement profile signal data (e.g., including distance indicating coordinate determining operations outlined above with reference to FIG. 3 and EQUATIONS 1 and 2). At a block 1240, the CPS electronics are operated to determine the measurement distance Z to the workpiece surface, based on the determined subpixel-resolution distance indicating coordinate determined at block 1235 and the CPS distance calibration data.

It will be appreciated that while the above-described error compensation methods may be suitable for "in the field" applications, the methods may also be utilized for factory calibration processes. In other words, in the factory the error compensation methods may be utilized for generating error compensation factor data in comparison to various references such as "standardized" or "master" light sources and/or detectors, or the like, if desired.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for operating at least a source+detector subsystem of a chromatic point sensor (CPS), the method comprising:
   (a) providing CPS electronics including a CPS source+detector subsystem comprising a CPS light source and a CPS wavelength detector;
   (b) inputting light from the CPS light source into a bypass optical path that bypasses at least a portion of a normal operation optical path that is directed through a CPS optical pen of the CPS during normal workpiece measuring operations, and inputting the bypass light that is output from the bypass optical path to the CPS wavelength detector;
   (c) forming a raw intensity profile of the bypass light distributed over a plurality of pixels along a measurement axis of the CPS wavelength detector;
   (d) operating the CPS wavelength detector to provide a set of raw intensity profile signals corresponding to the plurality of pixels along the wavelength detector measurement axis;
   (e) determining error-compensation factor data based on the set of raw intensity profile signals, the error-compensation factor data corresponding to the plurality of pixels along the wavelength detector measurement axis, wherein the error-compensation factor data are determined such that they are applicable to reduce an amount of wavelength-dependent variation for at least one of short-range variations and long-range variations included in the set of raw intensity profile signals; and
   (f) storing the determined error-compensation factor data in correspondence to the CPS source+detector subsystem.

2. The method of claim 1, wherein the plurality of pixels comprises at least one of a majority of pixels included in the CPS wavelength detector and each pixel within a pixel range that receives light during normal measurement operations of the CPS.

3. The method of claim 1, wherein the error-compensation factor data comprises at least one of error-compensation polynomial data and a set of error-compensation data including members corresponding to the plurality of pixels.

4. The method of claim 1, wherein the error-compensation factor data are determined such that they are applicable to reduce the amount of wavelength-dependent variation for the short-range variations included in the set of raw intensity profile signals.

5. The method of claim 4, wherein the error-compensation factor data are determined such that they are applicable to reduce the amount of wavelength-dependent variation for short-range variations due to causes comprising thin film interference effects associated with the CPS wavelength detector.

6. The method of claim 4, wherein determining the error-compensation factor data comprises performing filtering operations on the set of raw intensity profile signals to isolate signal components corresponding to the short-range variations.

7. The method of claim 4, wherein determining the error-compensation factor data comprises:
   performing filtering operations on the set of raw intensity profile signals to provide a short-range filtered set of intensity profile signals wherein the signal components corresponding to the short-range variations are removed by the filtering operations; and
   determining at least one of a difference and a ratio between a member of the set of raw intensity profile signals corresponding to a pixel and a member of the short-range filtered set of intensity profile signals corresponding to that pixel.

8. The method of claim 7, wherein the error-compensation factor data are determined such that they are applicable to reduce the amount of wavelength-dependent variation for the long-range variations included in the set of raw intensity profile signals, and wherein determining the error-compensation factor data comprises determining at least one of a difference and a ratio between a member of the short-range filtered set of intensity profile signals corresponding to a pixel and a member of a standardized set of intensity profile signals corresponding to that pixel.

9. The method of claim 1, wherein determining the error-compensation factor data comprises determining at least one of a difference and a ratio between a member of the set of raw intensity profile signals corresponding to a pixel and a member of a standardized set of intensity profile signals corresponding to that pixel.

10. The method of claim 1, wherein the error-compensation factor data are determined such that they are applicable to reduce the amount of wavelength-dependent variation for the long-range variations included in the set of raw intensity profile signals.

11. The method of claim 10, wherein the error-compensation factor data are determined such that they are applicable to reduce the amount of wavelength-dependent variation for long-range variations due to causes comprising wavelength-dependent intensity variations associated with the light source.

12. The method of claim 1, wherein the bypass optical path excludes any chromatically dispersive lens element of any CPS optical pen and comprises one of (a) an optical fiber path directly from the light source to the CPS wavelength detector, (b) an optical fiber path comprising a portion of the normal operation optical path and an optical fiber loop configured to receive light from the light source through the portion of the normal operation optical path and return light to the CPS wavelength detector through the portion of the normal operation optical path, and (c) an optical fiber path comprising a portion of the normal operation optical path and a mirror element configured to receive light from the light source through the portion of the normal operation optical path and reflect light to the CPS wavelength detector through the portion of the normal operation optical path.

13. The method of claim 1, the method further comprising:
(g) providing a CPS optical pen operationally connected to the CPS electronics using the normal operation optical path;
(h) providing CPS distance calibration data corresponding to the CPS optical pen;
(i) operating the CPS to focus a plurality of respective wavelengths of light at a plurality of corresponding respective focus distances;
(j) arranging a workpiece surface at a measurement distance Z relative to the CPS optical pen and reflect light from the workpiece surface to the CPS optical pen, and transmitting the resulting spectrum to form a measurement intensity profile distributed over the plurality of pixels along the CPS wavelength detector measurement axis;
(k) operating the CPS wavelength detector to provide a set of raw measurement profile signal data corresponding to the plurality of pixels along the wavelength detector measurement axis;
(l) correcting the set of raw measurement profile signal data to determine a set of error-compensated measurement profile signal data, wherein correcting the set of raw measurement profile data signal data comprises applying the error compensation factor data to reduce the effects of wavelength-dependent variations that are associated with the CPS source+detector subsystem in the set of raw intensity profile signals;
(m) determining a subpixel-resolution distance indicating coordinate corresponding to the measurement distance Z to the workpiece surface, based on the set of error-compensated measurement profile signal data; and
(n) determining the measurement distance Z to the workpiece surface, based on the determined subpixel-resolution distance indicating coordinate and the CPS distance calibration data.

14. The method of claim 13, wherein the CPS source+detector subsystem is a current source+detector subsystem, and wherein the CPS distance calibration data corresponding to the CPS optical pen is based on pen calibration measurement profile signal data that is determined using one of (a) error-compensated measurement profile signal data from the current source+detector subsystem and (b) a different source+detector subsystem used to provide measurement profile signal data that is comparable to the error-compensated measurement profile signal data from the current source+detector subsystem.

15. A method for operating a chromatic point sensor (CPS), the method comprising:
(a) providing CPS electronics including a CPS source+detector subsystem comprising a CPS light source and a CPS wavelength detector;
(b) providing current error-compensation factor data determined in correspondence to the CPS source+detector subsystem, wherein the error-compensation factor data are determined such that they are applicable to reduce an amount of wavelength-dependent variation for at least one of short-range variations and long-range variations included in a set of raw measurement profile signal data provided by the CPS source+detector subsystem;
(c) providing a CPS optical pen operationally connected to the CPS electronics using a normal operation optical path;
(d) providing CPS distance calibration data corresponding to the CPS optical pen;
(e) operating the CPS to focus a plurality of respective wavelengths of light at a plurality of corresponding respective focus distances;
(f) arranging a workpiece surface at a measurement distance Z relative to the CPS optical pen and reflect light from the workpiece surface to the CPS optical pen, and transmitting the resulting spectrum to form a measurement intensity profile distributed over a plurality of pixels along a measurement axis of the CPS wavelength detector;
(g) operating the CPS wavelength detector to provide a set of raw measurement profile signal data corresponding to the plurality of pixels along the wavelength detector measurement axis;
(h) correcting the set of raw measurement profile signal data to determine a set of error-compensated measurement profile signal data, wherein correcting the set of raw measurement profile data signal data comprises applying the current error-compensation factor data to reduce the effects of wavelength-dependent variations that are associated with the CPS source+detector subsystem in the set of raw intensity profile signals;
(i) determining a subpixel-resolution distance indicating coordinate corresponding to the measurement distance Z to the workpiece surface, based on the set of error-compensated measurement profile signal data; and
(j) determining the measurement distance Z to the workpiece surface, based on the determined subpixel-resolution distance indicating coordinate and the CPS distance calibration data.

16. The method of claim 15, wherein the CPS source+detector subsystem is a current source+detector subsystem, and wherein the CPS distance calibration data corresponding to the CPS optical pen is based on pen calibration measurement profile signal data that is determined using one of (a) error-compensated measurement profile signal data from the current source+detector subsystem and (b) a different source+detector subsystem used to provide measurement profile signal data that is comparable to the error-compensated measurement profile signal data from the current source+detector subsystem.

17. The method of claim 16, wherein the different source+detector subsystem used to provide measurement profile signal data that is comparable to the error-compensated measurement profile signal data from the current source+detector subsystem comprises one of:

(a) a source+detector subsystem used to provide error-compensated measurement profile signal data based on error compensation factors determined relative to a standardized set of intensity profile signals, wherein the current source+detector subsystem provides error-compensated measurement profile signal data based on current error compensation factors determined relative to the same standardized set of intensity profile signals; and (b) a source+detector subsystem configured to provide approximately ideal raw intensity profile signals relative to the standardized set of intensity profile signals.

18. The method of claim 17, wherein the CPS distance calibration data corresponding to the CPS optical pen is expressed as polynomial data that relate distance indicating coordinates to corresponding measurement distances.

19. The method of claim 15, wherein the CPS source+detector subsystem is a current source+detector subsystem, the method further comprising determining new error-compensation factor data for the current source+detector subsystem by performing steps (b) through (e) of claim 1, using the CPS electronics of claim 15.

20. The method of claim 19, further comprising at least one of (a) determining if the new error-compensation factor data is significantly different than the current error-compensation factor data and, if it is significantly different, providing a corresponding indicating signal from the CPS electronics, and (b) replacing the current error-compensation factor data with the new error-compensation factor data in step (b) of claim 15, and repeating the steps of claim 15.

* * * * *